US006977372B2

(12) United States Patent
Valaskovic et al.

(10) Patent No.: US 6,977,372 B2
(45) **Date of Patent: *Dec. 20, 2005**

(54) METHOD FOR FEEDBACK CONTROLLED ELECTROSPRAY

(75) Inventors: Gary A. Valaskovic, Cambridge, MA (US); Mike S. Lee, Newtown, PA (US)

(73) Assignee: New Objective, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/800,232

(22) Filed: Mar. 12, 2004

(65) Prior Publication Data

US 2004/0173743 A1 Sep. 9, 2004

Related U.S. Application Data

(62) Division of application No. 10/154,767, filed on May 24, 2002, now Pat. No. 6,744,046.
(60) Provisional application No. 60/293,341, filed on May 24, 2001.

(51) Int. Cl.[7] .......................... B01D 59/44; H01J 49/00
(52) U.S. Cl. ....................................... 250/288; 250/281
(58) Field of Search ................................. 250/281, 288

(56) References Cited

U.S. PATENT DOCUMENTS

| | | | | |
|---|---|---|---|---|
| 4,935,624 A | | 6/1990 | Henion et al. | 250/288 |
| 5,115,131 A | | 5/1992 | Jorgenson et al. | 250/288 |
| 5,306,412 A | | 4/1994 | Whitehouse et al. | 204/299 |
| 5,349,186 A | | 9/1994 | Ikonomou et al. | 250/288 |
| 5,393,975 A | | 2/1995 | Hail et al. | 250/288 |
| 5,423,964 A | | 6/1995 | Smith et al. | 204/180.1 |
| 5,504,329 A | | 4/1996 | Mann et al. | 250/288 |
| 5,572,023 A | | 11/1996 | Caprioli | 250/288 |
| 5,873,523 A | | 2/1999 | Gomez et al. | 239/3 |
| 5,977,540 A | | 11/1999 | Reents, Jr. | 250/288 |
| 6,111,251 A | | 8/2000 | Hillenkamp | 436/288 |
| 6,149,815 A | | 11/2000 | Sauter | 250/635 |
| 6,211,516 B1 | | 4/2001 | Syage et al. | 250/288 |
| 6,245,227 B1 | * | 6/2001 | Moon et al. | 210/198.2 |
| 6,259,101 B1 | | 7/2001 | Wexler et al. | 250/423 |
| RE37,485 E | | 12/2001 | Vestal | 436/47 |
| 6,373,067 B1 | | 4/2002 | Shimomura | 250/397 |
| 6,462,337 B1 | | 10/2002 | Li et al. | 250/288 |
| 6,464,892 B2 | * | 10/2002 | Moon et al. | 216/79 |
| 6,690,006 B2 | * | 2/2004 | Valaskovic | 250/288 |
| 6,744,046 B2 | * | 6/2004 | Valaskovic et al. | 250/288 |
| 2001/0001456 A1 | | 5/2001 | Moon et al. | 210/635 |
| 2001/0001474 A1 | | 5/2001 | Moon et al. | 239/3 |
| 2001/0007350 A1 | | 7/2001 | Moon et al. | 250/282 |
| 2001/0013490 A1 | | 8/2001 | Moon et al. | 210/198.3 |
| 2001/0016424 A1 | | 8/2001 | Moon et al. | 438/712 |
| 2001/0037979 A1 | | 11/2001 | Moon et al. | 210/656 |
| 2002/0000517 A1 | | 1/2002 | Corso et al. | 250/288 |
| 2002/0003210 A1 | | 1/2002 | Marcus | 250/288 |

OTHER PUBLICATIONS

Carney, L., A. Nguyen, et al (2001) *Reproducibility and Conductivity Effects on Current Oscillations in Electrosprays*, Proceedings of the 49$^{th}$ Annual Conference on Mass Spectrometry and Allied Topics, Chicago, IL.

(Continued)

*Primary Examiner*—John R. Lee
*Assistant Examiner*—Kalimah Fernandez
(74) *Attorney, Agent, or Firm*—Norris, McLaughlin & Marcus, P.A.

(57) ABSTRACT

Feedback control system for electrospray nozzle using optical system for monitoring and controlling dynamic or static morphology of the fluid exiting the electrospray nozzle.

10 Claims, 33 Drawing Sheets

OTHER PUBLICATIONS

Cloupeu, M. and B. Prunet–Foch (1994), “Electrohydrodynamic Spraying Functioning Modes: A Critical Review”, *J. Aerosol Sci* 25(6): 1021–1036.

DeJuan, L. and J. Fernandez De La Mora (1997), “Charge and Size Distributions of Electrospray Drops”, *J. Colloid and Interface Sci*. 186: 280–293.

Gomez, A. and K. Tank (1994), “Charge and Fission of Droplets in Electrostatic Sprays”, *Phys. Fluids* 6(1): 404–414.

Grace, J.M. and J.C.M. Marignissen (1994), “A Review of the Liquid Atomization by Electrical Means”, *J. Aerosol Sci*, 25(6): 1005–1019.

Jaworek, A. and A. Krupa (1999), “Classification of the Modes of EHD Spraying”, *J. Aerosol Sci*. 30(7): 873–893.

Juraschek, R. and F.W. Rollgen (1998): “Pulsation Phenomena During Electrospray Ionization”, *Int. J. Mass Spectrum* 177: 1–15.

Abstract—“Dependence of Electrospray Ionization Efficiency on Axial Spray Modes”, Juraschek, R., A. Schmidt, et al. (1998) *Adv, Mass Spectrum.*

Naqwi, A. (1994), “In Situ Measurement of Submicron Droplets in Electrosprays Using a Planar Phase Doppler System”, *J. Aerosol Sci*, 25(6): 1201–1211.

Olumee, Z., J.H. Callahan, et al (1998), “Droplet Dynamics Changes in Electrostatic Sprays of Methanol–Water Mixtures”, *J. Phys. Chem*, 102: 9154–9160.

Tang, K. and A. Gomez (1994), “On the structure of an Electrostatic Spray of Monodisperse Droplets”, *Phys. Fluids* 6: 2317–2332.

Tang, K. and A. Gomez (1995), “Generation of Monodisperse Water Droplets from Electrosprays in a Coronoa–Assisted Cone–Jeft Mode”, *J. Colloid and Interface Sci.*, 175: 326–332.

Taylor, G (1964), “Disintegration of Water Drops in an Electric Field”, *Pro. R. Soc. A* A280: 383–397.

Zeleny, J. (1914), “The Electrical Discharge from Liquid Points, and A Hydrostatic Method of Measuring the Electric INtensity at Their Surfaces”, *Phys. Rev*. 3(2): 69–91.

Zeleny, J. (1917), “Instability of Electrified Liquid Surfaces”, *Phys. Rev.*, 10(1): 1–6.

Zhou, S., A.G. Edwards, et al (1999), “Investigation of the Electrospray Plume by Laser–induced Fluorescence Spectroscopy”, *Anal. Chem.*, 71: 769–776.

Product Literature, New Objective, Inc. 2002.

* cited by examiner

METHOD FOR FEEDBACK CONTROLLED ELECTROSPRAY

This application is a Division of U.S. application Ser. No. 10/154,767 now U.S. Pat. No. 6,744,046, issued Jun. 1, 2004.

This invention pertains to a novel method and apparatus for the feedback control of electrospray processes through opt-electronic feedback.

The novel method and apparatus is applicable to the field of analytical chemistry, specifically, the area of chemical analysis by the technique of electrospray ionization coupled to mass spectrometry. By the inventive method and apparatus, opto-electronic feedback is used to create an electrospray system that is self-controlling and obtains optimal signal under varying experimental conditions. The inventive method and apparatus is particularly useful in electrospray ionization mass spectrometry (LC-MS), sample preparation for matrix assisted laser desorption ionization mass spectrometry (MALDI MS), and general sample preparation by electrospray.

BACKGROUND OF THE INVENTION

Since the original works of Zeleny (Zeleny, J., Phys. Rev., 1914, 3, 69–91; Zeleny, J., Phys. Rev., 1917, 10, 1–6) and Taylor (Taylor, G., Pro. R. Soc. A, 1964, A280, 383–397), it has been known that the application of a high electric field to a liquid will cause the liquid to become unstable and to break up into many smaller daughter droplets. It is known that if a liquid effluent is pumped though a capillary nozzle, and the exit of the nozzle is placed in a high electric field relative to the surroundings, the liquid exiting the nozzle will break-up into a continuous stream of charged droplets, as shown in FIG. 1. This process of electrohydrodynamic atomization is commonly referred to as electrospray (Cloupeau, M. and Prunet-Foch, B., J. Aerosol Sci., 1994, 25, 1021–1036).

Electrospray has many practical applications. It has been utilized in the application of thin film coatings, thick film coatings such as electrostatic painting, and powder deposition. Importantly, it is also a practical source of ionization, in which ions present in the liquid are transformed to gas phase ions, through the process of atmospheric pressure ionization. In this configuration, electrospray is often used in combination with the analytical technique of mass spectrometry. Electrospray ionization-mass spectrometry is a method of nearly universal application for chemical analysis, finding wide use in chemical manufacturing, analytical chemistry, environmental chemistry, and perhaps most importantly in the life sciences. Electrospray is currently the method of choice to interface high performance liquid chromatographic (HPLC) separations to mass spectrometry, referred to here, as LC-MS. HPLC is a key tool in separation science, whereby a mixture of components in a liquid phase are seperated, with the mass spectrometry providing high specificity chemical identification. LC-MS plays a central role in pharmaceutical drug discovery and development. Thus practical improvements to the stability, and/or sensitivity, of the electrospray method are of considerable importance.

It is known to those skilled in the art that the stability of an electrospray process is a function of several interdependent parameters, such as:

(1). Nozzle (tip) geometry,
(2) Electric field strength, which is in turn a function of:
  (A) Applied voltage and
  (B) Distance to Counter electrode,
(3) Mobile phase flow rate,
(4) Mobile phase chemical composition.

Because of the interdependency of these variables, a certain amount of empirical work is required to tune each particular electrospray system for optimal results in each particular application. In most systems, one or more of the foregoing parameters are either fixed or difficult to adjust. In most systems, therefore, the tuning that is required to obtain electrospray stability is generally accomplished by varying and adjusting the electric field strength at the nozzle. This, in turn, requires adjusting either the applied voltage or the distance between the nozzle and counter electrode or mass spectrometer inlet system.

Electrospray systems are generally tuned by one of two different methods. In the first method, the electrospray nozzle is visualized through, for example, a microscope, video camera, etc. and then an operator manually adjusts experimental parameters, such as voltage, distance or both, until a satisfactory spray pattern is achieved. In a second method, the ion current generated by the electrospray process is monitored while the voltage, distance (between the nozzle and counter electrode or mass spectrometer inlet) or both are adjusted. The parameters are adjusted until an ion current of satisfactory magnitude or stability is obtained. Adjustments may be carried out under manual control by an operator, or under electronic (i.e., computer) control for an automatic tuning process. The ion current tuning method is most often employed when an electrospray system is being used as an ionization source in communication with a mass spectrometer.

Both of the foregoing methods have serious limitations. The manual method using visualization of the electrospray nozzle requires constant operator attention and adjustment, and does not respond to varying conditions unless the operator observes and reacts to such changing conditions. Ion current, as used in the second method, on the other hand, is not a completely satisfactory choice upon which to base control, because it is dependent on the chemical nature of the liquid exiting the electrospray nozzle. A change in the chemical composition will change the ion current. This results in a system that must be re-tuned when the chemical composition of the liquid changes.

It has been well established (Cloupeau, M. and Prunet-Foch, B., J. Aerosol Sci., 1994, 25, 1021–1036; Jaworek, A. and Krupa, A., J. Aerosol Sci., 1999, 30, 873–893) that the liquid effluent (the mobile phase) and subsequent spray exiting the nozzle may take on a wide variety of physical forms, or spray modes. Jaworek and Krupa (Jaworek, A. and Krupa, A., J. Aerosol Sci., 1999, 30, 873–893) identified ten distinct spray modes, each with definable time-dependant morphological characteristics. The specific spray mode obtained depends strongly upon the geometry of the nozzle, the strength and shape of the electric field, and the mobile phase chemical composition. The spray modes are particularly sensitive to the mobile phase surface tension, viscosity, and electrical conductivity (Grace, J. M. and Marijnissen, J. C. M., J. Aerosol Sci., 1994, 25, 1005–1019). FIG. 2 shows the basic relationship of the electrical potential and flow rate for the most common electrospray modes for an aqueous based mobile phase. The most commonly encountered modes are shown in FIGS. 3 through 8 and are referred to as: dripping mode, spindle mode, pulsed cone-jet mode, cone-jet mode, and multi-jet mode. Each mode will generate a given distribution of droplet sizes, with each droplet carrying a distribution of electrical charge. The dripping mode typically generates the largest observable droplets, producing drops that can be millimeters in diameter. These droplets can be larger in diameter than the nozzle itself. The cone-jet and multi-jet modes produce the smallest droplets having the highest charge-to-mass ratio. The cone-jet and multi-jet modes are capable of producing nearly monodisperse droplets, having a narrow distribution in both diameter and charge state. Droplet diameters for these modes can be sub-micrometer, much smaller than the diameter of the nozzle itself. Some modes, such as the spindle mode and pulsed cone-jet mode, generate droplets of a large distribution in size and charge, which is not desirable for many applications. These modes also exhibit a pulsing or oscillatory behavior, which can range in frequencies from tens of Hertz to hundreds of Kilohertz. The combination of a wide size distribution along with pulsing behavior is undesirable for many applications. In mass spectrometry, for example, spray pulsing can create poor reproducibility in signal measurement and waste sample, since ion current is not being generated 100% of the time. Large droplets are also known to contribute a significantly to the total ion current yielding a high degree of non-specific "chemical noise" to the mass spectrum.

Of the possible spray modes, the most desirable for many practical applications, including mass spectrometry, is the cone jet mode, as shown in FIG. 7. The cone-jet mode generates a fine aerosol of small, nearly mono-disperse droplets, 100% of the time. Furthermore such droplets are also known to have the highest possible charge-to-mass ratio. Such small, highly charged droplets are known to yield optimal sensitivity for analysis by mass spectrometry. Considerable interest in the prior art has been spent on the characterization of the individual modes and the droplet size distributions and ion signal intensities that result from such modes, with particular attention being paid to the cone-jet mode. A number of diagnostic techniques are available for such characterization.

The simplest method for determination of the spray mode is to utilize continuous illumination from a strong light source and observe the shape of the spray with an optical microscope using either transmitted light or scattered light illumination, as shown in FIG. 8. This method has been incorporated into a wide variety of experimental apparatus and is available commercially from a number of vendors (Product Literature, New Objective, Inc. 2002). For example Juraschek et al. (Juraschek, R., Schmidt, A. et al., Adv. Mass Spectrom., 1998, 14, 1–15) used this method to observe the spray mode in relation to the ion current as monitored by mass spectrometry. A relationship between ion intensity and the spray mode was established, with the axial cone-jet mode showing optimal results. Zhou et al. (Zhou, S., Edwards, A. G. et al., Anal. Chem., 1999, 71, 769–776) utilized laser illumination and fluorescence imaging detection to probe the fluorescence characteristics present in the spray. They were able to measure the pH of the plume for the cone-jet mode in a sheath gas assisted spray.

Another common method for characterization is imaging based on (nanosecond pulse) flash illumination, replacing the continuous light source. Zeleny (Zeleny, J., Phys. Rev., 1917, 10, 1–6) used a flash photographic system, that became the basis for much subsequent work, although the details of the flash electronics and imaging have since been vastly improved and modernized. Cloupeau and Prunet-Foch (Cloupeau, M. and Prunet-Foch, B., J. Aerosol Sci., 1994, 25, 1021–1036) utilized flash strobe imaging with an illumination time on the order of 20 nanoseconds. In addition, a focused laser beam intersected the droplet meniscus and a photo-detector was used to determine the timing of the electronic flash. The output of the photo-detector also yielded frequency information for the study of pulsating modes. Tang and Gomez (Tang, K. and Gomez, A., Phys. Fluids, 1994, 6, 2317–2332; Tang, K. and Gomez, A., J. Colloid and Interface Sci., 1995, 175, 326–332) utilized a Xenon nanosecond flash lamp to illuminate the cone-jet region in a CCD Camera based "shadowgraph" imaging system that was used to obtain digital images suitable for computer acquisition. This system was utilized to ensure that the spray was operating in a stable cone-jet mode for subsequent measurements. Strobed imaging systems such as these can determine the nature and stability of the cone-jet, and give direct size measurements of droplets typically larger than approximately 5 to 10 $\mu$m.

A common non-imaging means for spray characterization is the use of phase Doppler anemometry (PDA) (Naqwi, A., J. Aerosol Sci., 1994, 25, 1201–1211). PDA can determine both the velocity and size of a droplet as it passes though a detection zone. The measurement is made from detection of the light scattered by the droplet as it crosses interference fringes, which define the detection zone, created by the intersection of two focused laser beams. Three photodetectors detect the intensity and phase of the scattered light, and through a differential calculation, the size of the droplet is determined. Gomez and Tang used PDA to determine the fission characteristics of droplets produced by electrospray for heptane (Gomez, A. and Tang, K., Phys. Fluids, 1994, 6, 404–414; Tang, K. and Gomez, A., Phys. Fluids, 1994, 6, 2317–2332) and water (Tang, K. and Gomez, A., J. Colloid and Interface Sci., 1995, 175, 326–332) for the cone-jet mode. Olumee et al. (Olumee, Z., Callahan, J. H. et al., J. Phys. Chem., 1998, 102, 9154–9160) used PDA to determine droplet dynamics for methanol-water mixtures. The use of PDA alone is unable to distinguish a particular spray mode since it only samples a small percentage of the total droplets generated by the spray at one particular volume in space. For example, if the PDA detection zone is positioned off-axis to the nozzle, it will only detect the smaller droplets, and miss the larger droplets of the spindle and pulsed cone-jet modes.

Other methods have been used to either measure droplet size or to determine other spray characteristics using non-optical methods based on mobility. De Juan and Fernandez De La Mora (De Juan, L. and Fernandez De La Mora, J., J. Colloid and Interface Sci., 1997, 186, 280–293) utilized a differential mobility analyzer in conjunction with an aerodynamic size spectrometer to measure the charge and size distributions for electrospray drops for a number of organic solutions based on benzyl alcohol and dibutyl sebacate. The differential mobility analyzer was used to determine the charge on the droplet in conjunction with a microscope imaging system to monitor the spray mode exiting the capillary nozzle. Droplets passing though the mobility analyzer entered the aerodynamic spectrometer for size analysis. The aerodynamic spectrometer determines the diameter of a droplet from measuring the velocity of the droplet as it enters a supersonic jet. This method is of limited application to mass spectrometry since the measurement is a destructive technique and is limited to mobile phases of limited volatility. As with PDA, these non-optical methods are not directly capable of determining the particular spray mode.

Oscillations and pulsation in various spray modes have been detected by directly monitoring the spray current by a number of research groups including Juraschek and Rollgen (Juraschek, R. and Rollgen, F. W., Int. J. Mass Spectrom., 1998, 177, 1–15) and Vertes et al. (Carney, L., Nguyen, A. et al., Proceedings of the 49th Annual Conference on Mass Spectrometry and Allied Topics, 2001). In this configuration, as shown in FIG. 9A and FIG. 9B, the spray current supplied to the nozzle (FIG. 9A) or that detected on the counter electrode (FIG. 9B) is sent to an oscilloscope for frequency analysis. Juraschek and Rollgen (Juraschek, R. and Rollgen, F. W., Int. J. Mass Spectrom., 1998, 177, 1–15) observed low (10–50 Hz) and "high" frequency (1.5 to 2.5 kHz) pulsation and determined the dependence of the frequency on flow rate and mobile phase composition. Ion signal intensities were monitored simultaneously by mass spectrometry. The highest signal intensities were observed for the cone-jet mode. Even though the authors went to extensive efforts to maintain a high bandwidth detection system, this method is limited to the observation of only relatively low frequency oscillations of the larger droplets produced by the spindle and pulsed cone-jet modes. The current measurement technique is unfortunately inherently limited in bandwidth, and is apparently unable to distinguish the high frequency (>50–100 kHz) events. The reason is that the higher frequency events carry less current, typically in the picoamp range, and therefore require greater gain in the detection electronics. The greater gain requirements of the current amplifier serve to limit the bandwidth. System bandwidth is further limited by the presence of stray capacitance within the capillary nozzle, and between the capillary nozzle and counter-electrode. Although the authors suggest that this method obviates the need to determine the spray mode with an optical microscope, the highest oscillation frequencies observed by this technique were well below 5 kHz. It is known that higher pulsing frequencies are both possible and very likely to occur. This method leaves the spray insufficiently characterized.

For a given mobile phase composition, optimizing the spray is usually a matter of adjusting the flow rate and electric field potential (voltage) to generate and maintain the desired spray mode, which is often the cone-jet mode. Mobile phase composition is typically not a freely adjustable parameter, since the intended application usually dictates a specific range of chemical composition. In LC-MS, for example, the mobile phase typically consists of a mixture of acetonitrile and water, with a trace quantity (0.001 to 1%) of acid such as formic, acetic, or trifluoroacetic acid. When using electrospray for thin-film deposition the chemical composition of the mobile phase is similarly fixed. Such fixed chemical composition will only yield a cone-jet mode for a specific nozzle diameter, over a limited range in applied voltage and flow rate. In mass spectrometry, a well-established method for voltage optimization, presumably to the cone-jet or similar mode, is to observe the strength of the ion signal detected by the mass spectrometer while adjusting the voltage. A number of commercial instruments are capable of automatically tuning the spray voltage based on the highest ion intensity as observed by mass spectrometry.

Optimization methods based on either total spray current or specific ion current, such as that provided by mass spectrometry, yield a signal which is highly dependant on the chemical composition of the mobile phase. It is desirable to have a tuning method that is completely independent, if not orthogonal to the spray or ion currents generated by the spray.

Ion or spray current optimization methods fall short in many circumstances. Often, especially when operated with sample delivery by liquid chromatography, there is insufficient ion intensity to make a meaningful adjustment. Or one incorrectly chooses and maximizes an ion signal that relates to a noise peak, thus actually decreasing the amount of observable analyte ion signal by maximizing background noise. The situation in LC-MS is further complicated by the fact that the chemical composition of the mobile phase changes significantly when operated under conditions of gradient elution. In gradient elution chromatography, the mobile phase composition is typically ramped from one mobile phase composition to another. For example, at the start of an analytical run, the mobile phase may start with a composition of 5% Acetonitrile, 95% water and be reversed to 95% acetonitrile, 5% water at the end. If the spray voltage were adjusted to generate a cone-jet mode at the start of this run, then by the time the run is finished the mode is most likely to be in the unstable multi-jet mode due to the much lower surface tension of the 95% mixture of acetonitrile. Likewise if the voltage were adjusted for the cone-jet mode at the end of the run, the mode at the start would be the dripping or spindle mode. In practice one often makes a compromise where the cone-jet mode is maintained at the middle of run, sacrificing performance at the start and the end. Thus not only are the conditions for the cone-jet mode different at the ends of the run, they are continuously changing during the run itself. Thus during the run, the applied spray voltage must also change if the cone-jet mode is to be maintained during the gradient.

Flow rate is another parameter that is often not readily adjustable. In LC-MS for example, the mobile phase flow rate for a given experiment is often fixed within a specific range and is determined by the type of chromatography being preformed. It is also common that in combination with gradient chromatography that the flow rate of the mobile phase can change, resulting again in a need to adjust the spray voltage to maintain the cone-jet mode.

Prior attempts to deal with this unfavorable situation have been primarily concerned with the electrospray nozzle geometry. Most prior art focus on the use of sheath gases or liquids, the size and sharpness of the capillary spray nozzle, or using a combination of both. Rather than attempting to determine and control the specific spray mode, most of the methods attempt to eliminate the undesirable aspects of the large droplets generated by certain spray modes.

U.S. Pat. No. 4,935,624, teaches that the application of a heated sheath gas surrounding the capillary nozzle can be beneficial for sensitivity. U.S. Pat. No. 5,349,186 teaches that specific heating of the sheath gas can be beneficial, especially when spraying liquids composed primarily of water. These patents relate their increase in performance due to a decrease in droplet size when the sheath gas is present. U.S. Pat. Nos. 5,306,412 and 5,393,975 both teach the use of a triple layer nozzle, in which both liquid and/or gas can be co-axially applied to the capillary nozzle. Again, through the addition of sheath gas, the effects of modes that create larger sized droplets can be reduced. In addition, a sheath liquid can be used to aid in control of the mobile phase surface tension. Thus by adding a chemical modifier to the mobile phase to reduce surface tension, the droplet size is reduced, and sensitivity improves. A similar method is disclosed by Smith et al. (U.S. Pat. No. 5,423,964) to help deal with the uncertain chemistry when using electrospray to couple capillary electrophoresis with mass spectrometry.

U.S. Pat. Nos. 5,115,131; 5,504,329; and 5,572,023 show that spray performance, and hence sensitivity, can be improved if the size of the capillary nozzle is reduced. U.S. Pat. No. 5,504,329 shows that a wide range of chemical compositions may be suitably sprayed if the size of the nozzle is reduced to micrometer dimensions. The inventors relate the improvement in sensitivity to a reduction in droplet size caused by reductions in both flow rate and the diameter of the nozzle.

Moon et al. (U.S. Pat. No. 6,245,227 B1 and U.S. patent application Ser. No. 2001/0001474 A1) shows the use of lithographic fabrication techniques on planar substrates to fabricate a controlled nozzle geometry can be beneficial for low flow rate electrospray operation. The method of Moon et al. introduces the use of a secondary substrate voltage or voltages to control and enhance the strength of the electric field at the exit of the nozzle. In their configuration, the voltage applied to the nozzle is different from that applied to the mobile phase. The increase in field strength presumably generates smaller droplets for enhanced sensitivity. The inventors describe a system in which a spray attribute sensor or sensors integral to the nozzle substrate, would be used to control the nozzle voltage. Moon, et al. do not disclose how such a system might be implemented, constructed, or used for the determination and control of spray modes.

In US patent application US 2002/0000517 A1, Corso et al. disclose the fabrication and use of similar nozzles for improved sensitivity. Corso et al. also describe an increase in electrospray signal relating to the number of spray jets emanating from a single nozzle while in the multi-jet mode. While the inventors observe an increase in signal for each jet formed on the surface of the nozzle for a fixed mobile phase chemistry, they do not teach how such multiple jets may be actively controlled on a single nozzle. To overcome this limitation, the inventors resort to the fabrication and use of multiple nozzles, each supporting a single cone-jet mode.

For applications where the chemical composition of the mobile phase composition or flow rate can change, there is a need to have an electrospray based source that is capable of performing well under varying experimental conditions. Ideally this would be a system by which a particular spray mode can be established and maintained, regardless of the chemical composition or flow rate of the mobile phase. Furthermore it is desirable to have a system that can self optimize and self-correct in a manner which is completely independent of the ion current generated by the spray. None of the prior art provides a system that is self-tuning and capable of establishing and maintaining a given spray mode for varying mobile phase composition or flow rate.

SUMMARY OF THE INVENTION

The present invention improves on the heretofore known methods of controlling the stability of an electrospray process, by using a sub-system to monitor and control the dynamic or static morphology of the fluid exiting the electrospray nozzle.

The illuminator is positioned approx. 180 degrees below the microscope optic axis, yielding "bright field" illumination. This provides a transmitted light view for the camera.

Figure 12:
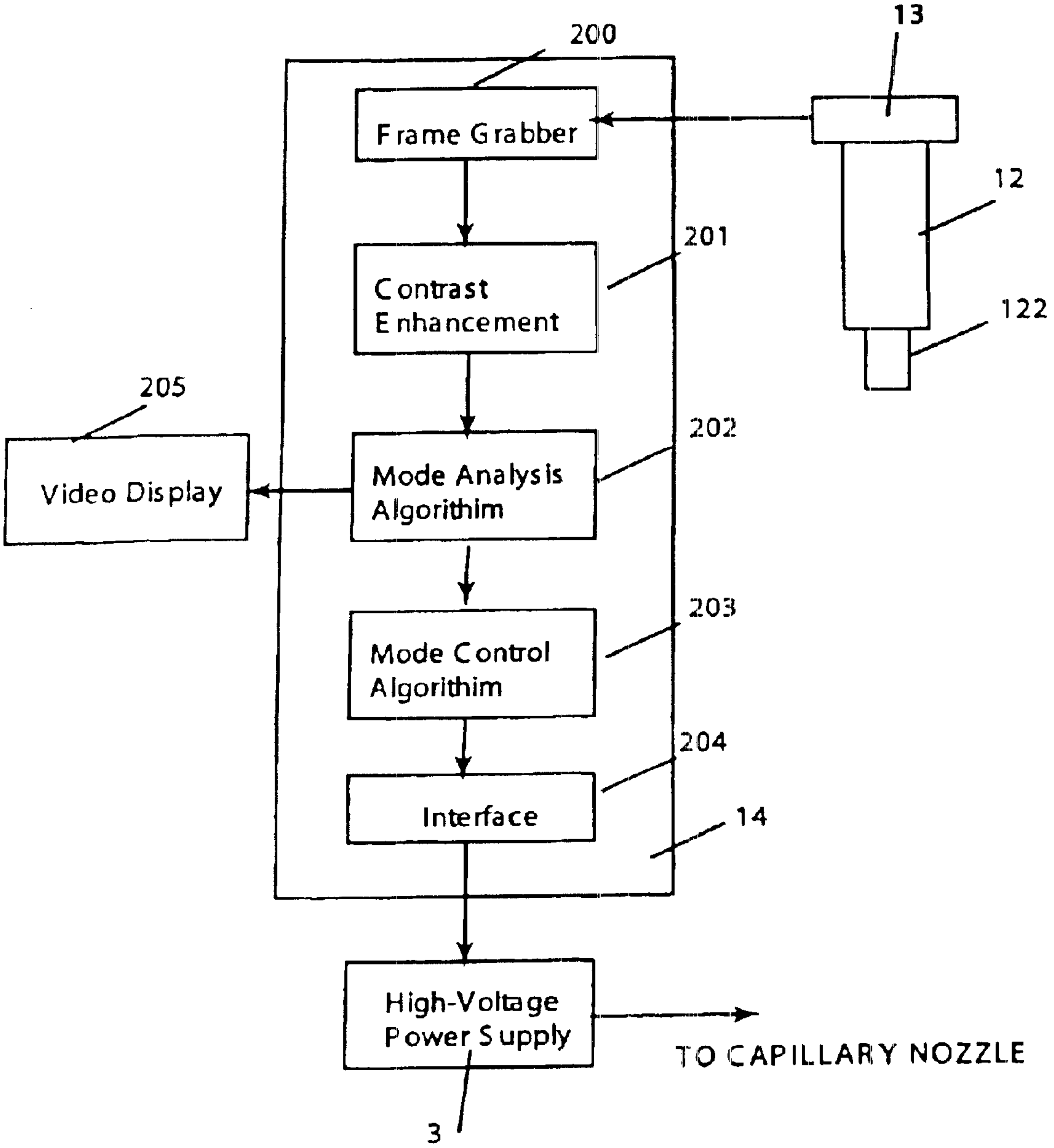

FIG. 12 Is a block diagram of the static control system. CCD microscope images are acquired by the computer, optimized for contrast, analyzed by mode analysis algorithm, and then the control algorithm makes any necessary adjustments to the nozzle voltage to maintain an optimal spray mode.

Figure 13:
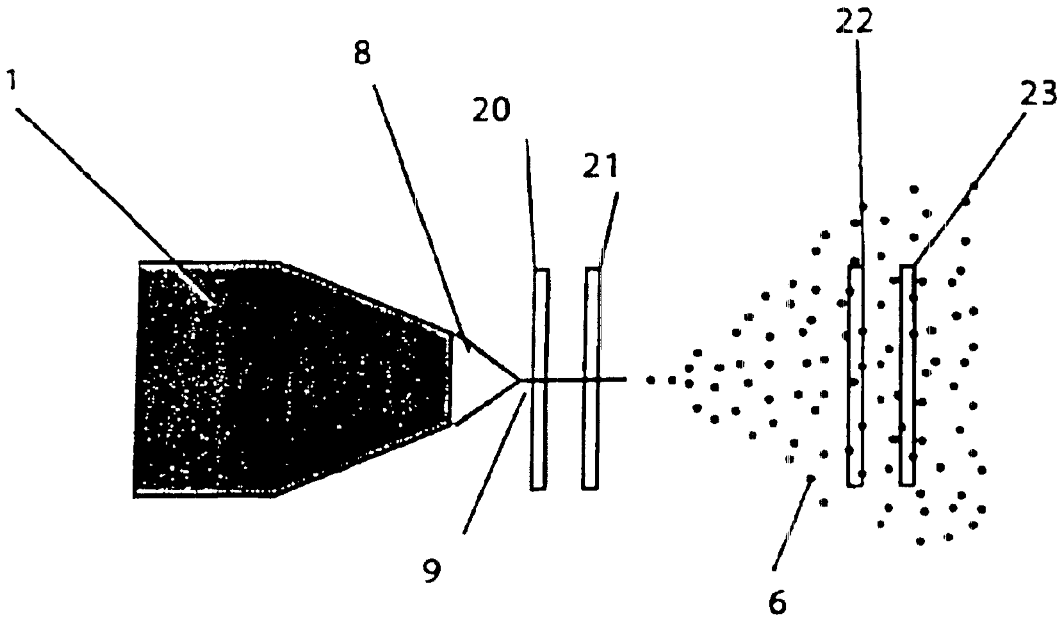

FIG. 13 Is a schematic of the region of interest selection for a typical spray pattern in the cone-jet mode of the present invention for example #1. In this case the image is divided into four zones, and the number of edges is determined in each zone.

Figure 14:
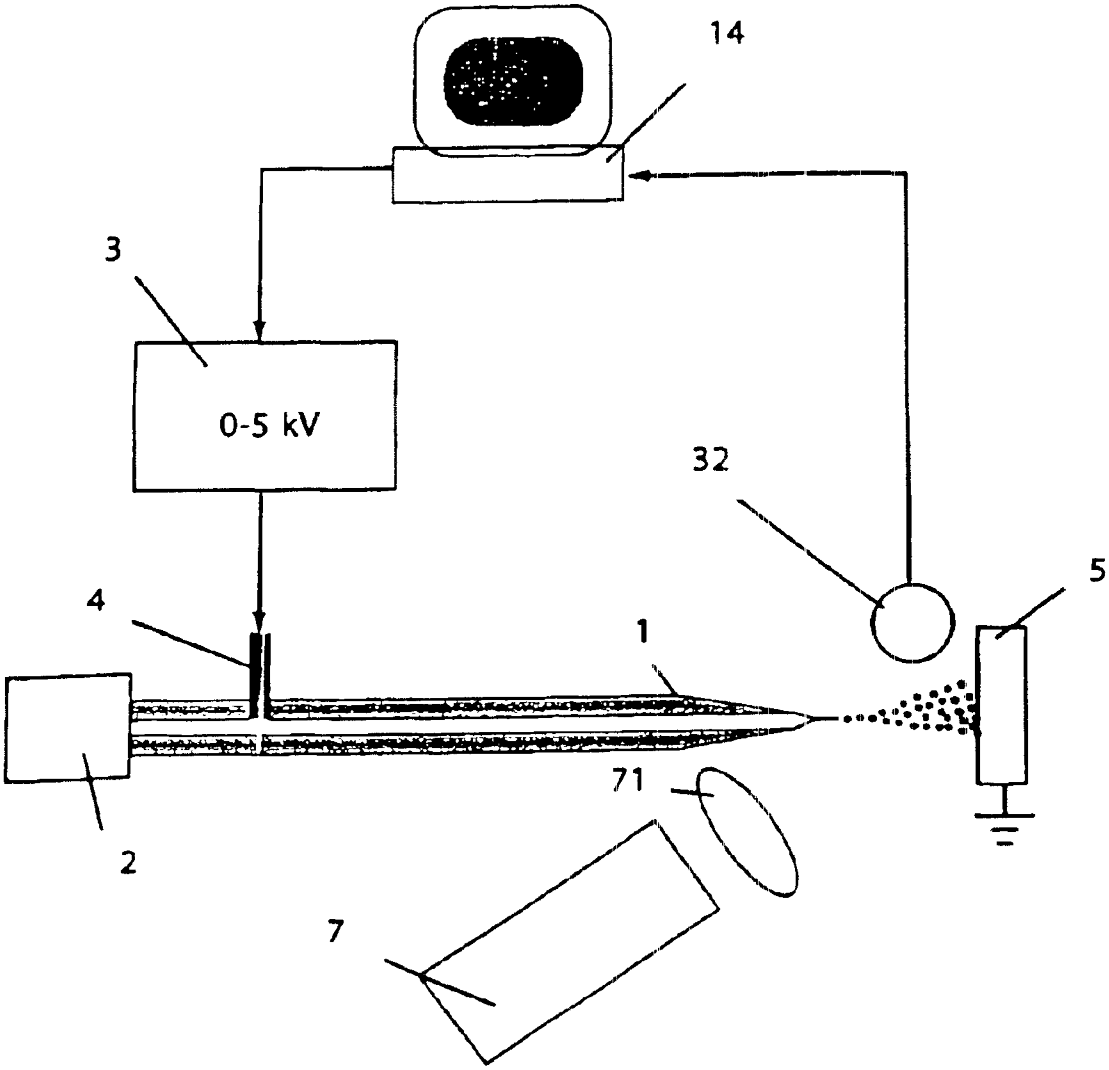

FIG. 14 Is a schematic of a basic system for dynamic control. A tightly focused beam of light, such as from a laser, is positioned to intersect the spray at a short distance from the nozzle. Any interruptions of the beam caused by liquid droplets will be detected by the photo-detector. The tighter the focus of the beam, the smaller the droplet that can be detected. The signal from the photo-diode is acquired by the control computer and analyzed for frequency content through waveform analysis. The control algorithm makes any necessary adjustment to the high voltage connected to the nozzle so as to optimize the incoming waveform signal.

Figure 15:
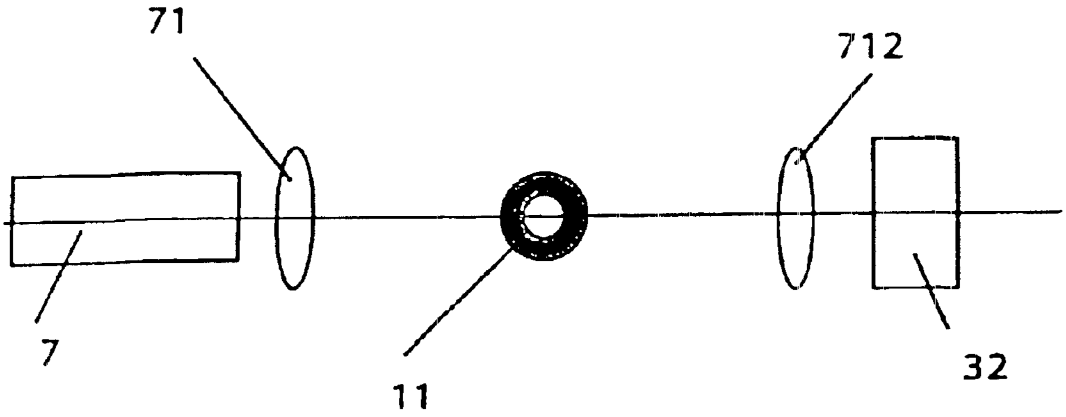

FIG. 15 Is a view of the dynamic control system as viewed down the axis of the capillary nozzle. The illuminator is positioned approx. 180 degrees from the photo-detector. The nozzle is positioned so that the droplets or aerosol will intersect the focused beam.

Figure 16:
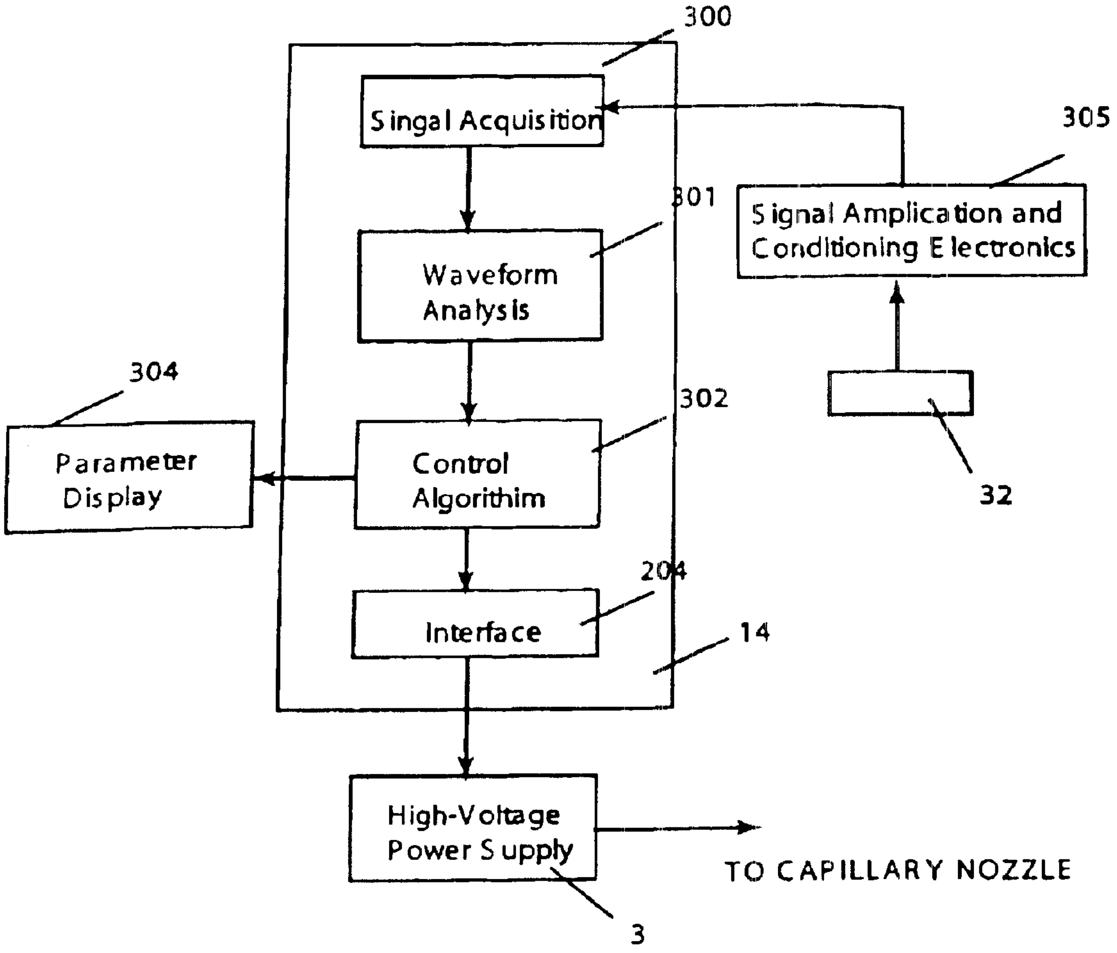

FIG. 16 Is a block diagram of the dynamic control system.

Figure 17:
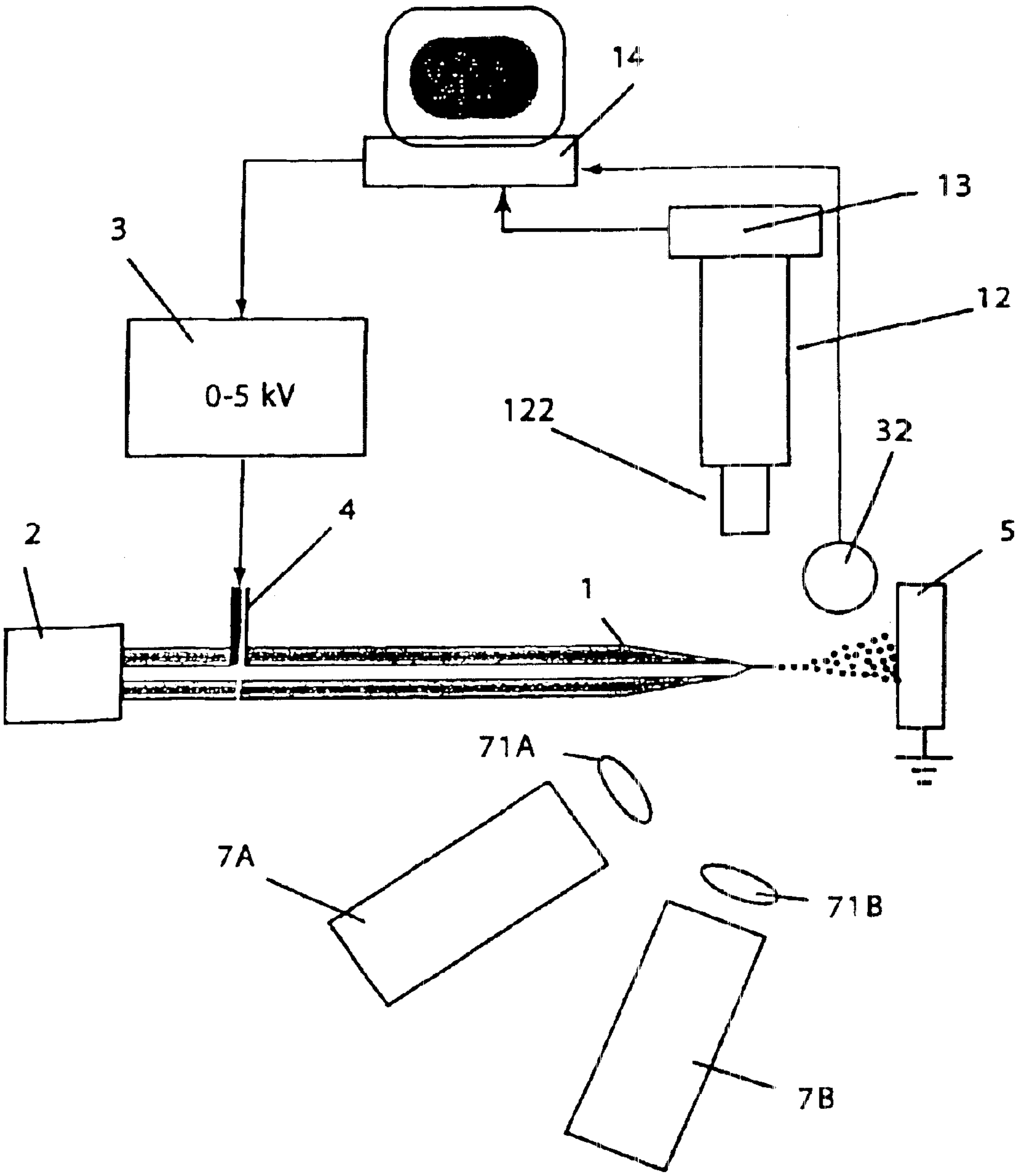

FIG. 17 Is a schematic of the hybrid control system, combining elements of the static and dynamic systems. The computer acquires both images from the CCD camera, as well as signal from the photodiode.

Figure 18:
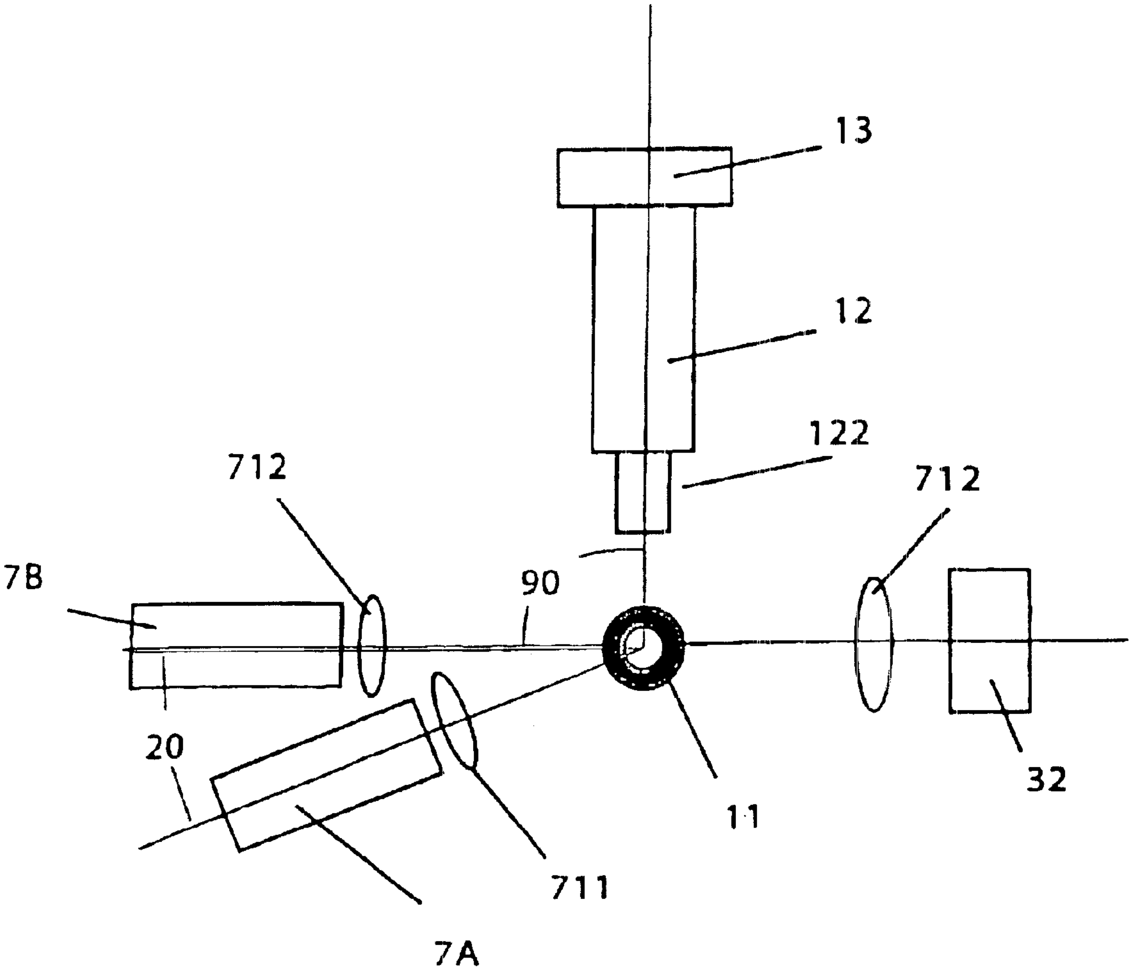

FIG. 18 Is a view of a hybrid control system as viewed down the axis of the capillary nozzle.

Figure 19:
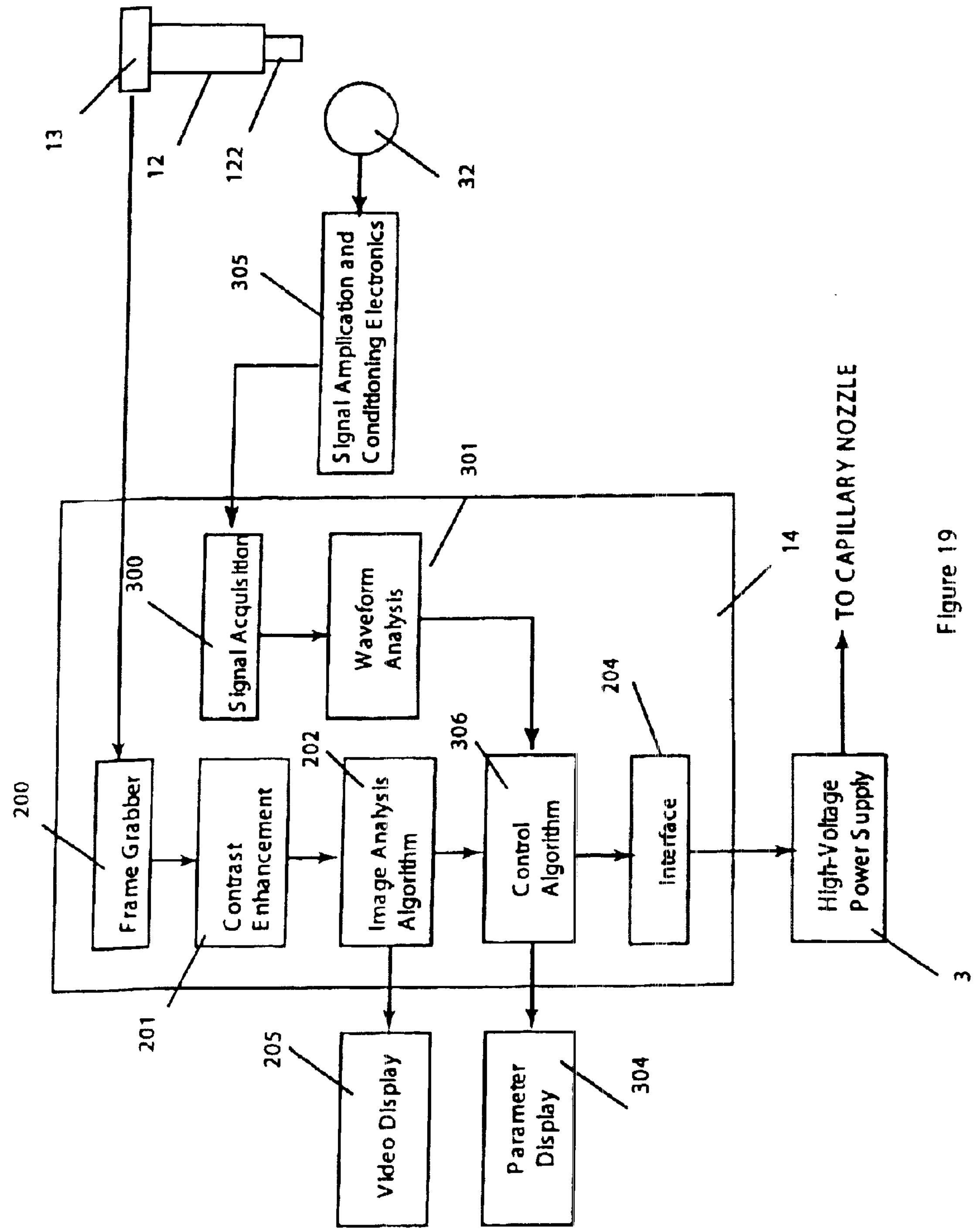

FIG. 19 Is a block diagram of a hybrid control system. The control algorithm is able to utilize data from both the CCD camera image acquisition and the signal from the photodiode.

Figure 20:
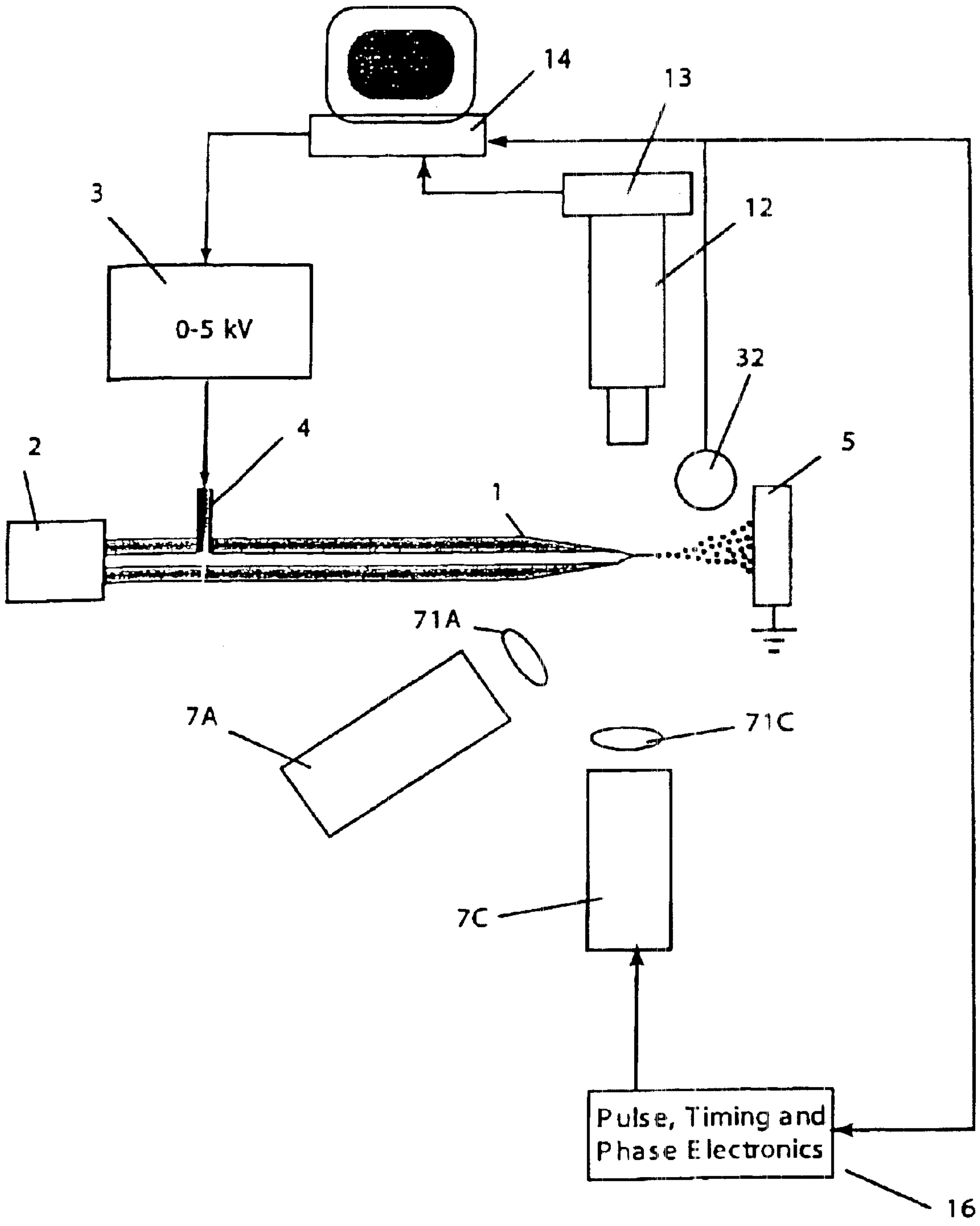

FIG. 20 Is a schematic of an alternate hybrid control system in which the illuminator for the static imaging system is provided from a strobed, or pulsed light source. The timing of the illumination pulse is generated by the signal provided by the photo-detector used in the dynamic control scheme. Thus the static imaging system is able to obtain a time "frozen" images of the spray and is better able to determine the precise morphology of the spray mode.

Figure 21:
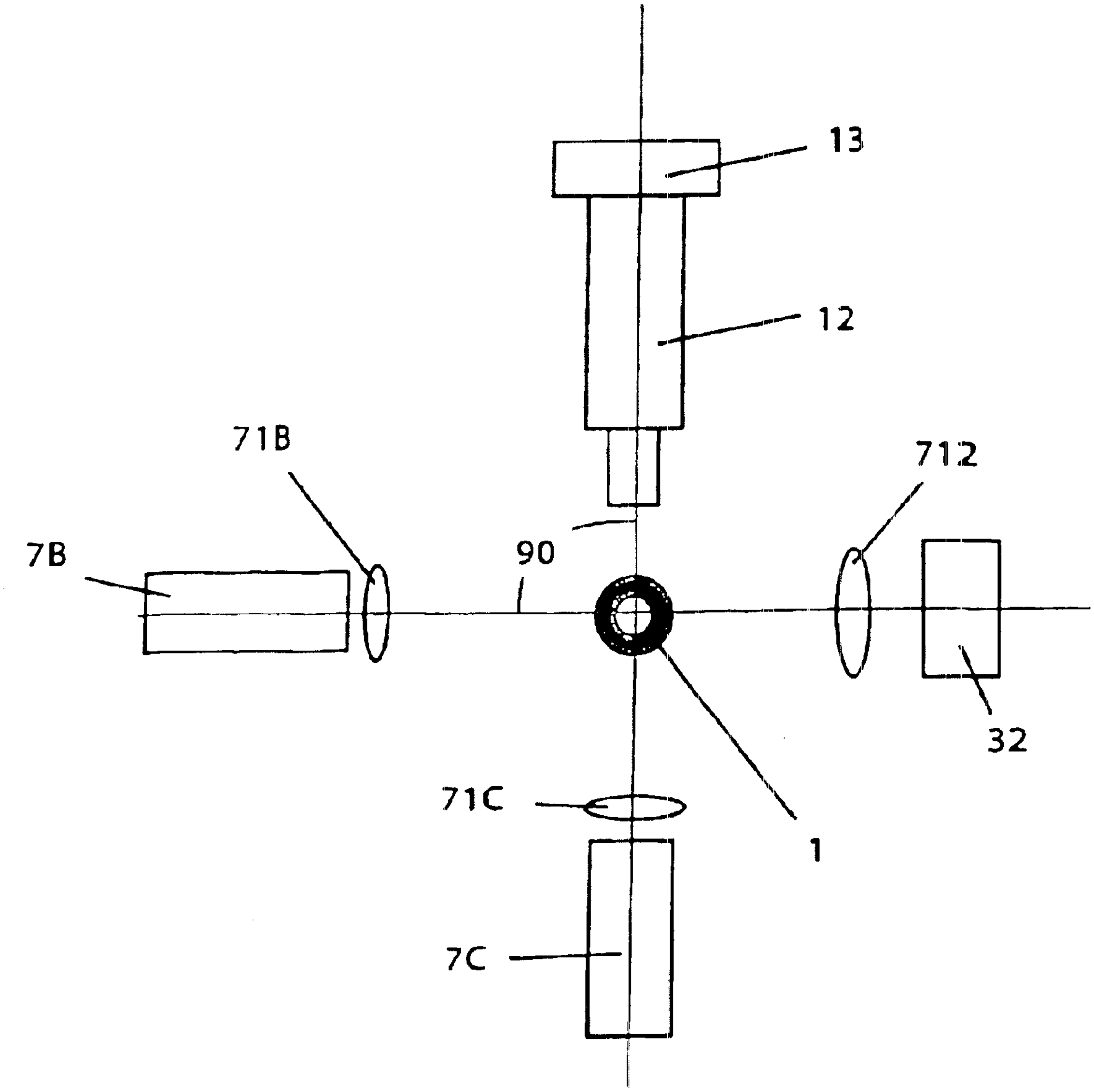

FIG. 21 Depicts a preferred embodiment of the hybrid strobed control system viewed down the axis of the nozzle. The strobed light source is positioned to yield a transmitted light view of the nozzle and spray.

Figure 22:
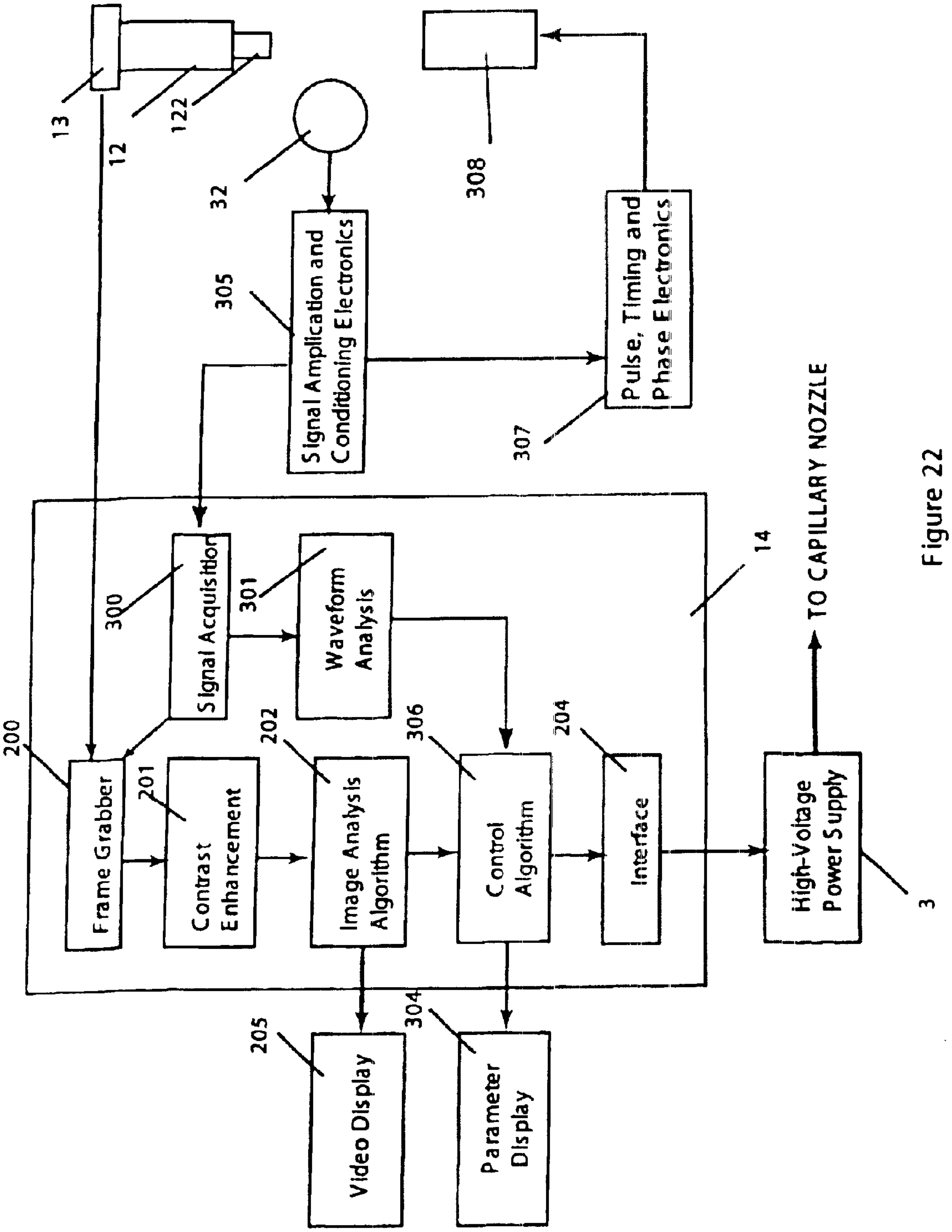

FIG. 22 Is a block diagram of the hybrid strobe control system. In this embodiment the timing and pulse electronics for the strobed illumination is provided by control electronics independent of the control computer.

Figure 23:
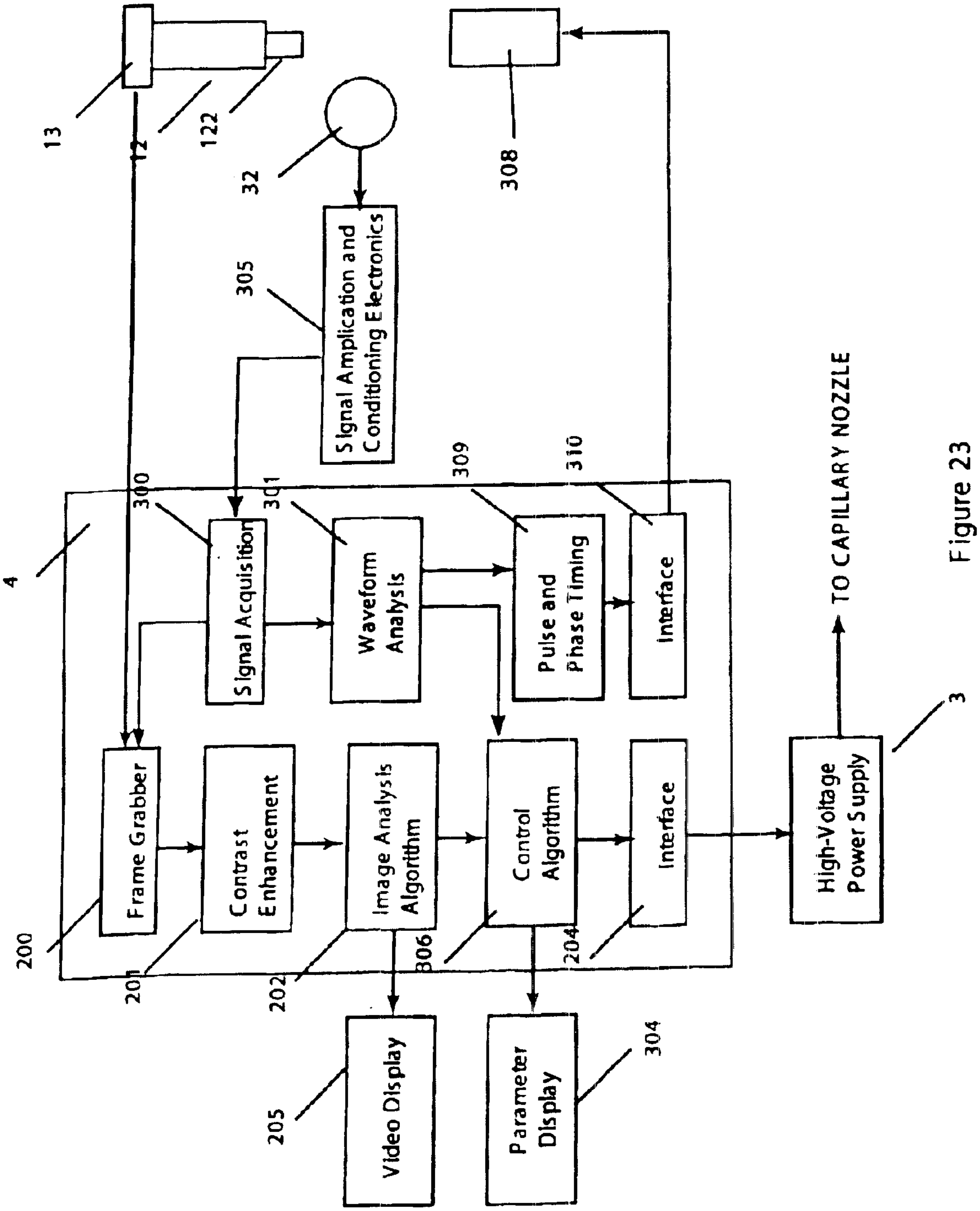

FIG. 23 Is a block diagram of an alternate hybrid strobe control system. In this embodiment the timing and pulse control for the strobed illumination is provided by the control computer.

Figure 24A:
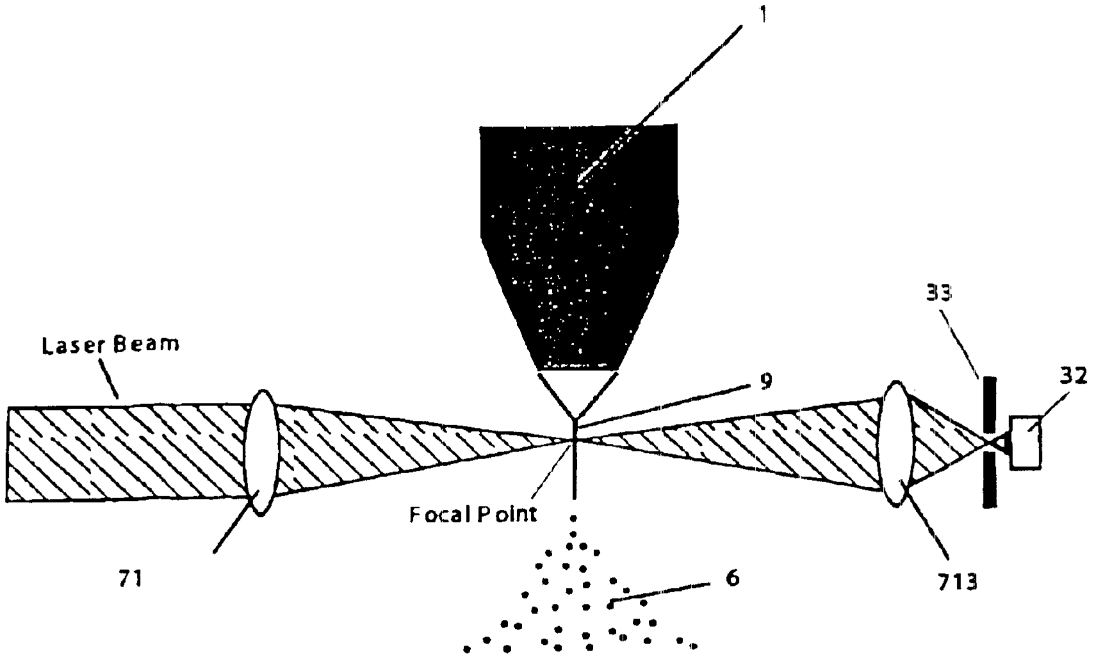

FIG. 24A Depicts the positioning of the laser beam, focusing lenses, and detector relative to the capillary nozzle and spray for dynamic detection using a con-focal optical system as viewed from above the plane of the nozzle. The focal point of the beam is positioned to intersect the jet. A lens with a coincident focal point is positioned in front of a pinhole aperture and photo-detector to eliminate light from other focal planes.

Figure 24B:
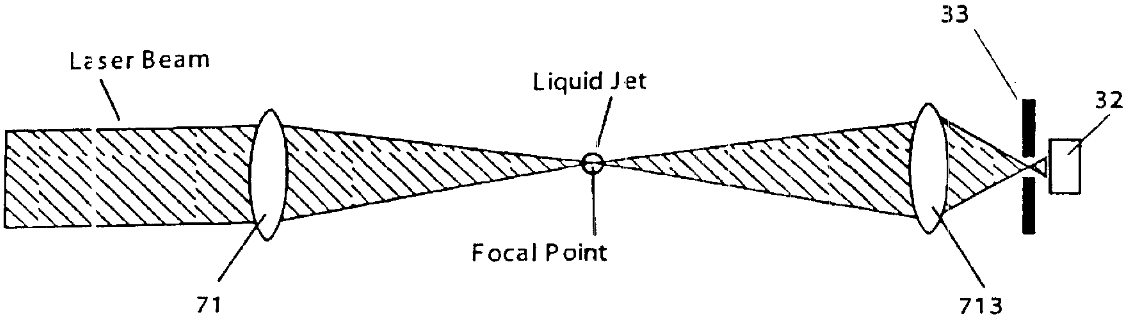

FIG. 24B: Is a perspective of the apparatus in FIG. 24A as viewed down the axis of the capillary nozzle.

Figure 25:
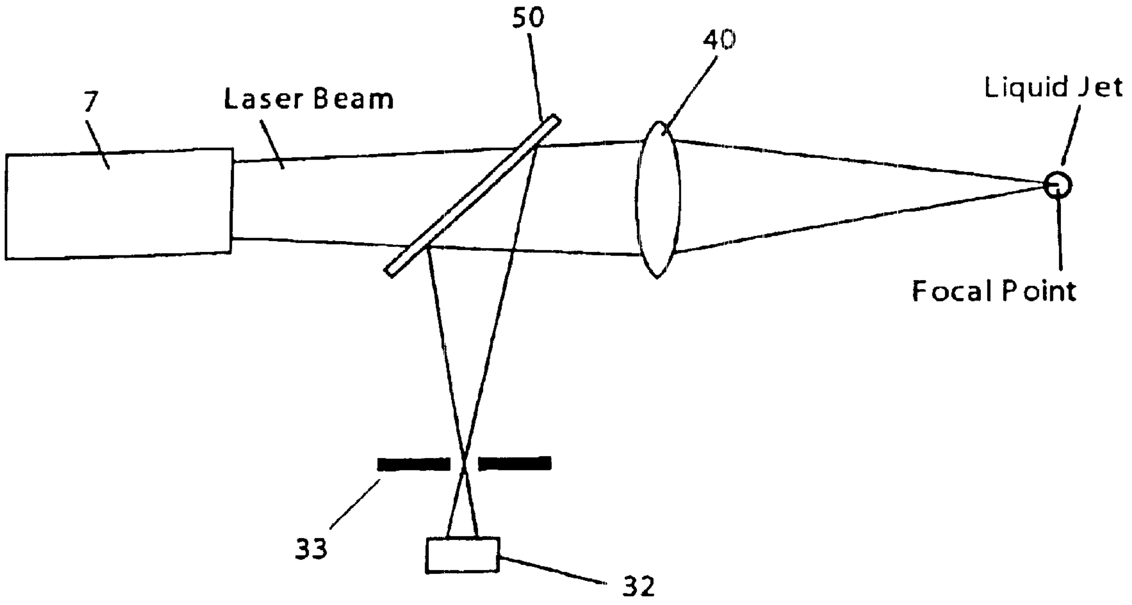

FIG. 25 Illustrates positioning of the laser beam, beam-splitter, focusing lens, and detector relative to the capillary nozzle and spray for dynamic detection using an epi-illumination con-focal optical system. The focal point of the beam is positioned to intersect the jet. The beam-splitter located in the rear focal plane of the lens directs scattered light collected by the lens through the pinhole aperture positioned in front of the photo-detector.

Figure 26:
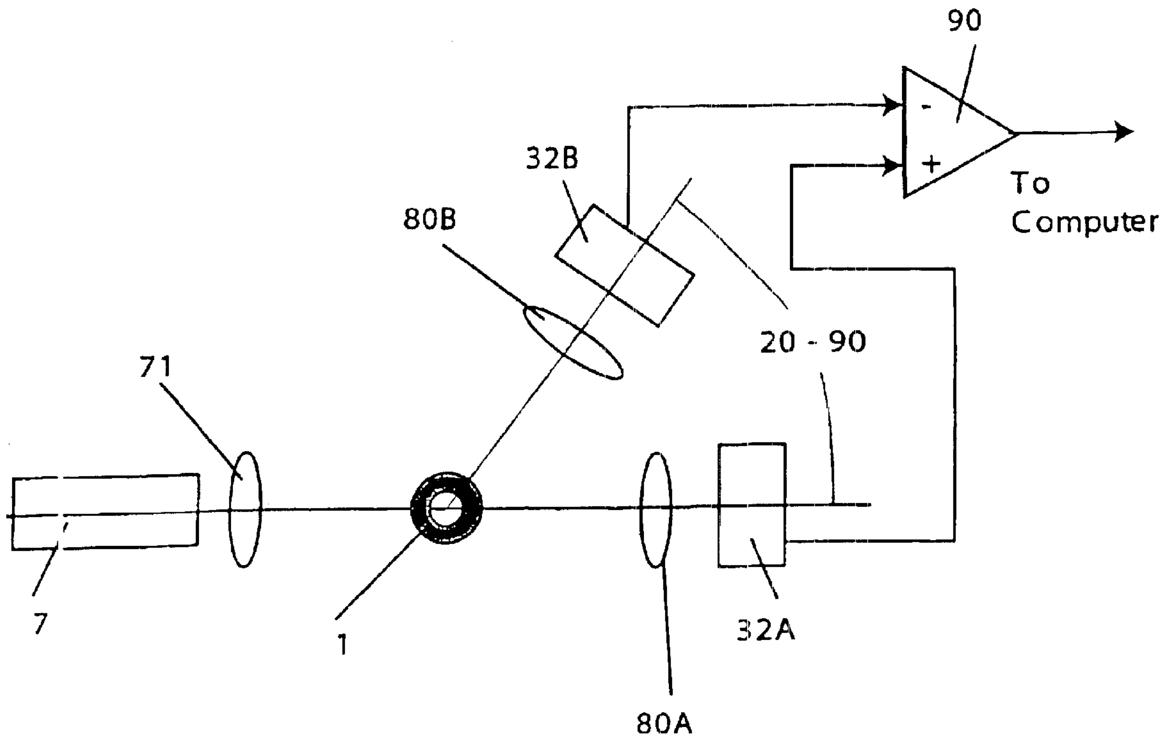

FIG. 26 Depicts an alternate dynamic detection system utilizing two detectors for differential detection. Positioning of the laser beam, focusing lenses and detectors as viewed down the axis of the capillary nozzle is shown. This system is capable of rejecting system noise inherent to the light source.

Figure 27:
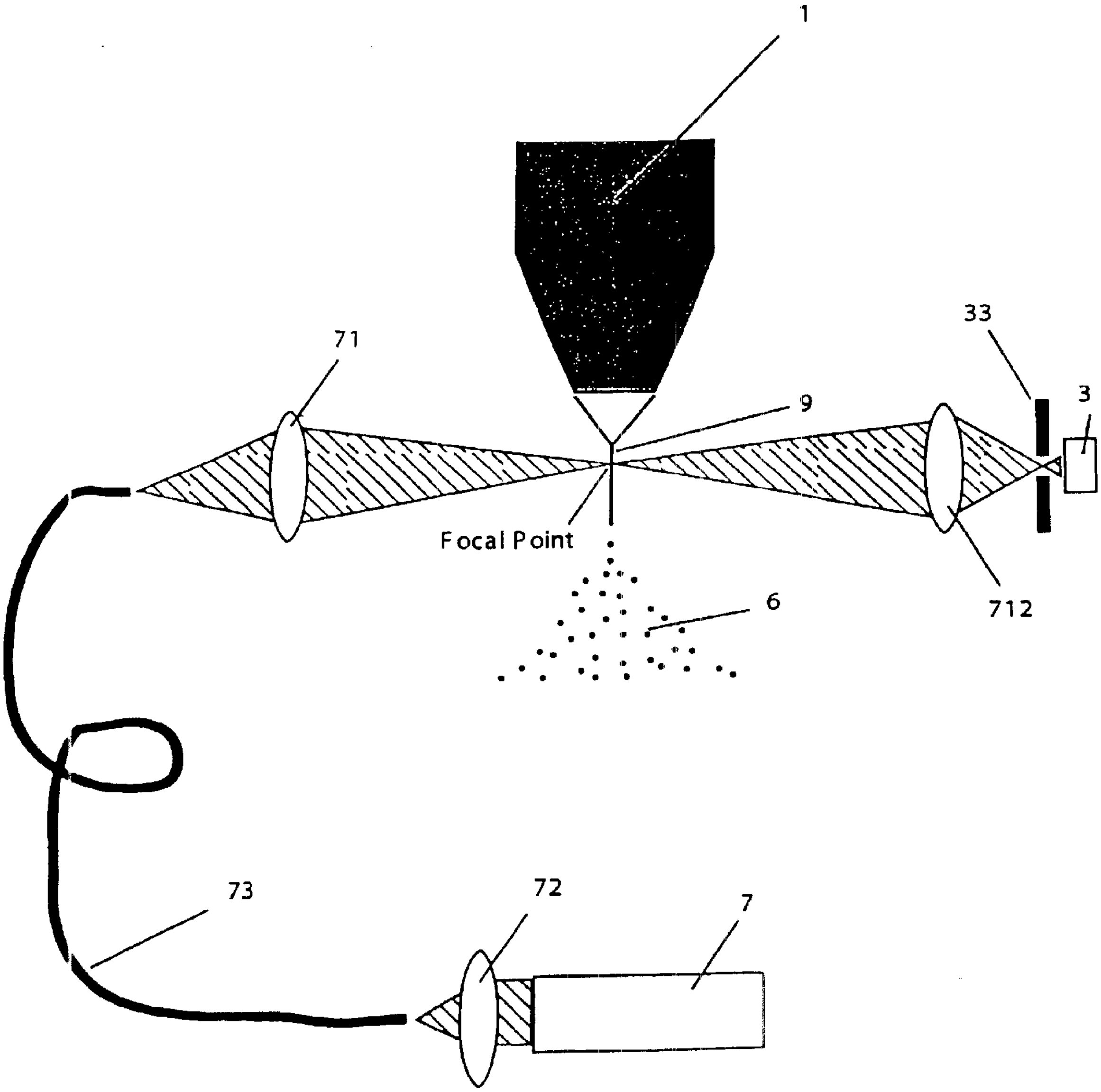

FIG. 27 Depicts an illumination system for dynamic control utilizing fiber optic delivery for the laser beam. The use of fiber optics permits the remote localization of the laser source.

Figure 28:
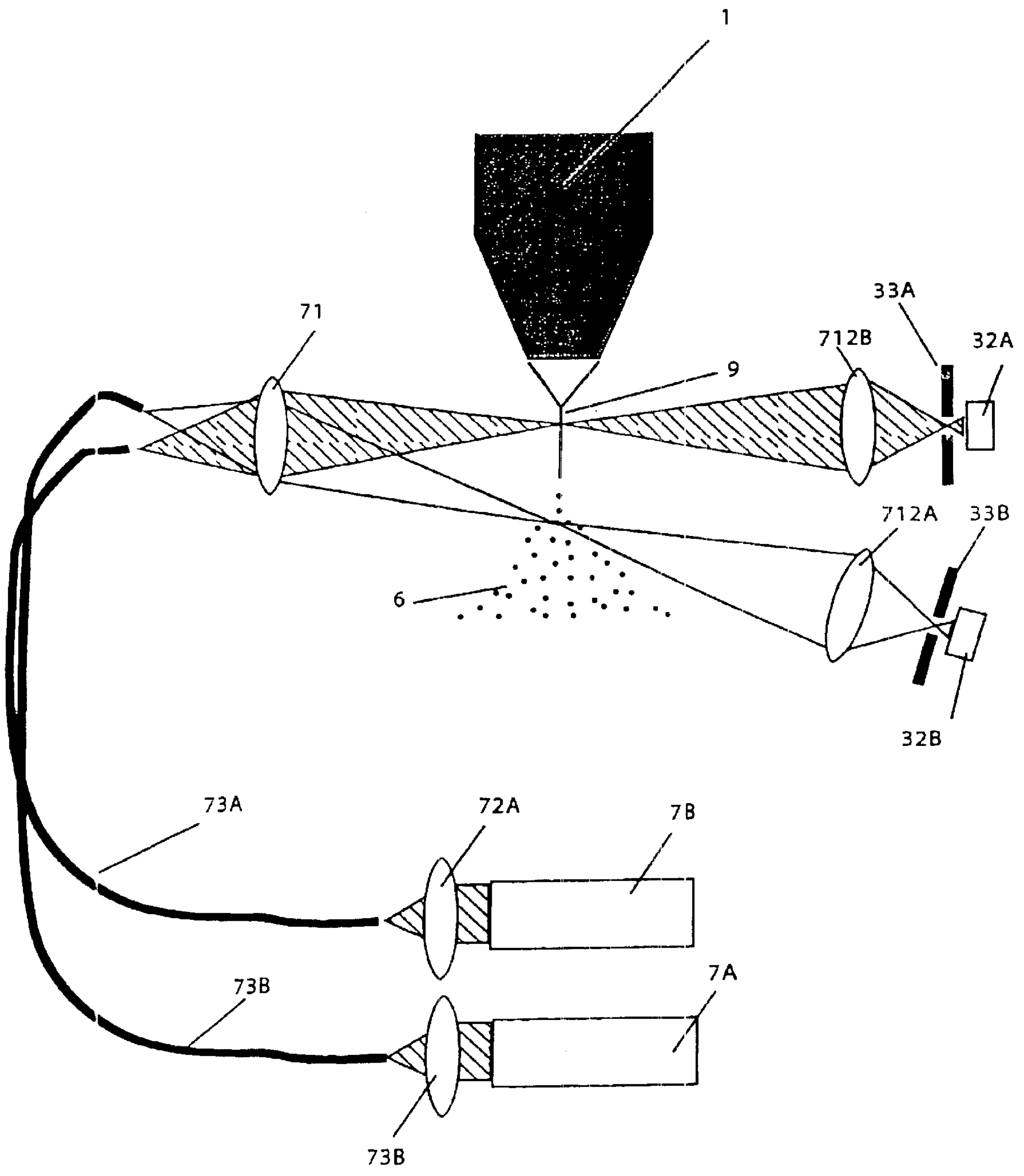

FIG. 28 Depicts an illumination system for dynamic control utilizing fiber optic delivery for multi-beam delivery. The use of fiber optics permits the addition of multiple probe beams, allowing one beam to probe the jet and another to probe the plume. By controlling the angle of each fiber optic individually the beam positions can be independently controlled.

Figure 10:
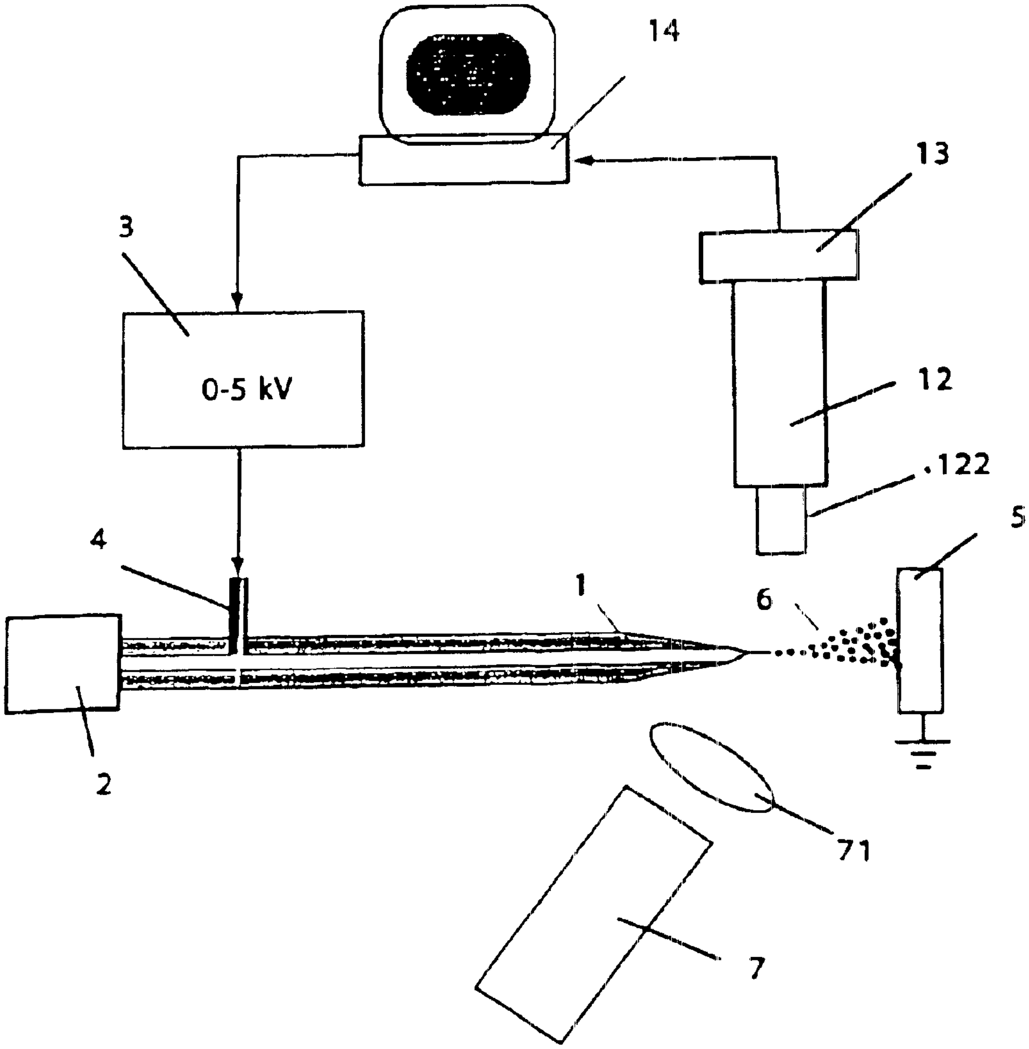
FIG. 10 Is a schematic of an implementation of a static control system according to the invention, as described in Example 1. The electrospray aerosol generated at the exit of the capillary nozzle is illuminated with a light source and imaged with a CCD camera equipped microscope. The intense light source is positioned and focused to optimize contrast and the scattering of light by the aerosol droplets. The computer acquires and analyzes the image of the aerosol, and makes any necessary adjustment to the high voltage connected to the nozzle so as to optimize the aerosol morphology.
Figure 29:
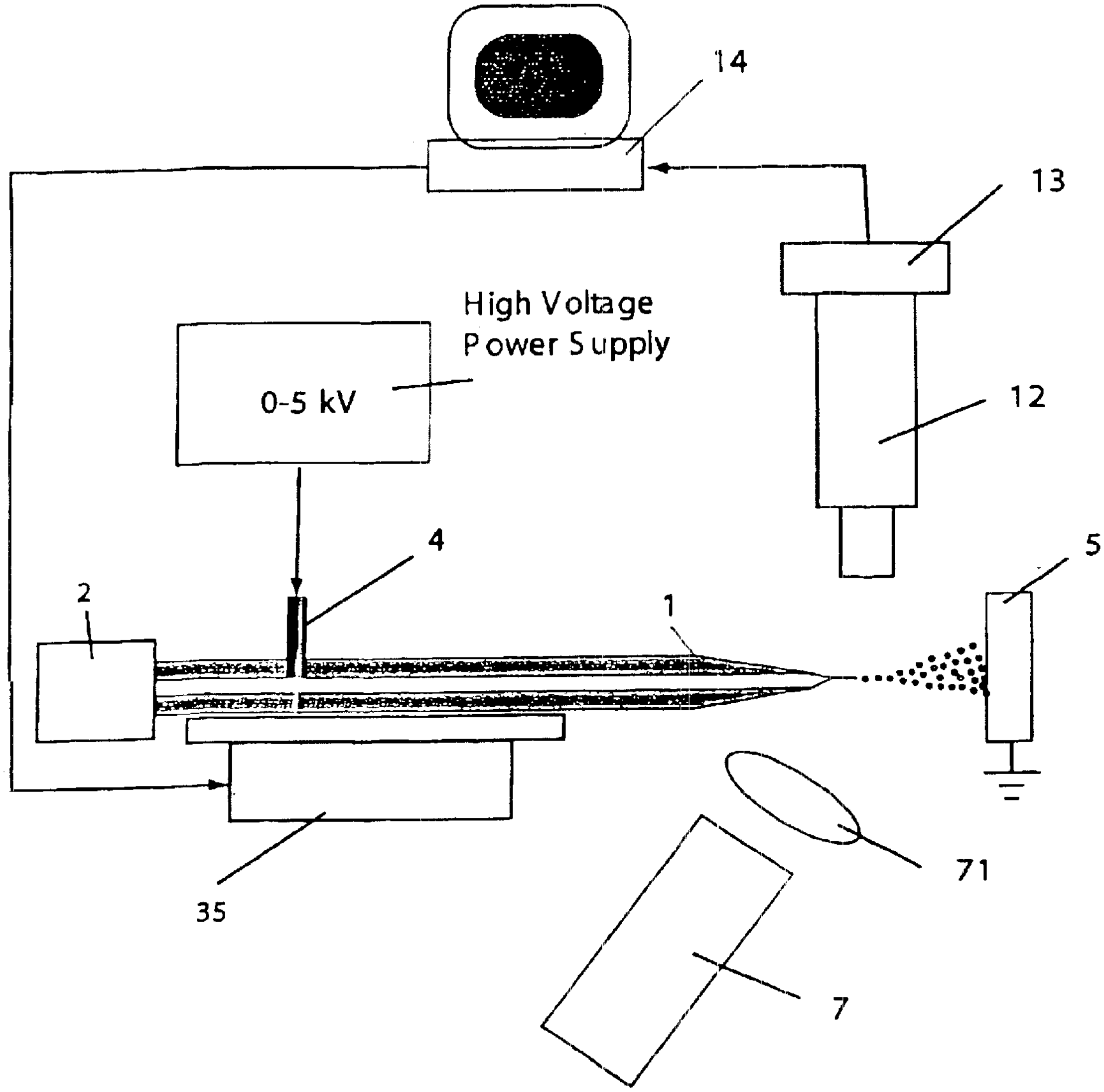

FIG. 29 depicts an electrospray control system which is analogous to that of FIG. 10, except that the output of computer 14 is transmitted to motor driven translation stage 35, which moves capillary nozzle either towards or away from counterelectrode 5.

DETAILED DESCRIPTION

It is important that the method used to monitor the morphology of the fluid exiting the electrospray nozzle be one that is not directly related to the ion current being generated by the electrospray process. In this regard, the monitoring method used in the practice of the present invention is preferably one that is orthogonal to ion current, in that the indicators relied upon to monitor the morphology are not functions of ion current. The orthogonal method to be used in accordance with the invention should, of course, also be one that is not affected, or is affected only to a minor degree, by varying chemical composition of the materials exiting the electrospray nozzles being monitored. In addition to avoiding the disadvantages discussed above, such a monitoring system has the further advantage that it does not require the presence of an ion current monitoring system, such as a mass spectrometer, for control. The invention therefore has application in areas not directly related to electrospray mass spectrometry.

It has now been discovered that optical sensing and detection methods meet the foregoing requirements for orthogonality. Therefore, in accordance with the invention, a feedback control sub-system having the following features is provided:

(1) A source of light, with focusing optics to interact with the liquid exiting the electrospray nozzle. Such sources of light include, but are not limited to, lasers and light emitting diodes, (2) One or more optical detectors to detect both the scattered and transmitted light patterns. Such optical detectors include, but are not limited to, a linear photodiode array, a CCD or CMOS array, or a series of discrete photodiodes. The detector optionally includes imaging hardware;

(3) An electronic detection and amplification system to convert the photo-electronic signals to electronic signals, (4) A computer or microprocessor system to interpret the signals generated by the foregoing elements, and (5) A computer or microprocessor system for electrospray electric field control, which is in communication with (4), the signal interpretation system. Electric field control is optionally accomplished by either moving the nozzle or changing the voltage applied to the nozzle with respect to the counter electrode.

The electronic detection and amplification system used to convert the photo-electronic signals to electronic signals may, optionally, be incorporated into the optical detector, one of the computers or may be a separate component.

The computers or microprocessors (3) and (4) may optionally be combined into a single computer or a microprocessor.

Further components may also be included in the system, as appropriate, such as but not limited to, components for conditioning and amplification of signals from the optical detector as, for example, is necessary or appropriate. Such additional components are used, for example, where the optical detector is a photodiode.

The control system of the present invention can be configured as a static control system, a dynamic control system or a hybrid system.

In the static control system, as shown in FIG. 10, a signal interpretation system generates patterns of information that give an instantaneous, or single-point-in-time definition (i.e., a snap-shot view) of the liquid cone, jet and plume of the fluid exiting the electrospray nozzle. This configuration requires detection electronics that carry spatial information.

The temporal response of this detection system can be relatively slow, from about 0.1 second to about 1 minute, for example.

In the dynamic method as shown in FIG. 14, fast detection and control electronics, including, for example, photodiodes, are utilized to probe the morphology of the liquid exiting the electrospray nozzle, on a real time basis. It is known, for example, that in the electrospray process the bulk fluid exiting the electrospray nozzle undergoes a transformation (break-up) into a jet and subsequent plume of tiny droplets, i.e., a plume of sub-micrometer to micrometer sized droplets. The formation of droplets occurs on a fast time scale, on the megahertz magnitude of scale. The dynamic control system can measures and controls either the generation frequency of droplet formation or the frequency of spray mode pulsation, or both.

The dynamic method utilizes electronics that carry largely temporal information. This system can be constructed with a single detector, rather than an array of detectors.

In the static method, the overall shape of the liquid jet and droplet plume are used for control. In the dynamic method, the rate of droplet generation or spray mode pulsation is used for control.

It is also within the scope of the present invention to provide a hybrid system that incorporates features of both the static and dynamic control methods as shown in FIG. 17.

Each system is capable of utilizing expert systems feedback control in which an operator teaches the system optimal operating conditions. The feedback system then controls the variables so that the output of the detection system attains the properties of the optimal condition. In this way, the control system "locks in" the desired spray pattern or droplet generation signal. A self-learning system may also be constructed, using the feedback control system in communication with ion current monitoring.

Static Control System:

The static spray mode control system of the present invention involves the use of a "machine vision" system in which an image acquisition and analysis computer determines the spray mode either through direct empirical measurements or through comparative analysis. This machine vision system forms the core of a feedback loop in which a control algorithm adjusts an experimental parameter so that a particular spray mode is obtained and maintained.

A shown in FIG. 10 one preferred embodiment of a static control system comprises: A computer controlled high voltage power supply, a suitable light source for illumination, a video microscope imaging system capable of generating images suitable for digital computer acquisition, a computer for digital image acquisition, a suitable image analysis algorithm to determine the spray mode, and a suitable control algorithm to maintain the desired spray mode.

As shown in FIG. 10, the electrospray aerosol generated at the exit of the capillary nozzle is illuminated with a light source and imaged with a CCD camera equipped microscope. The intense light source is positioned and focused to optimize contrast and the scattering of light by the aerosol droplets. The computer acquires and analyzes the image of the aerosol, and makes any necessary adjustment to the high voltage connected to the nozzle so as to optimize the aerosol morphology.

Figure 11A:
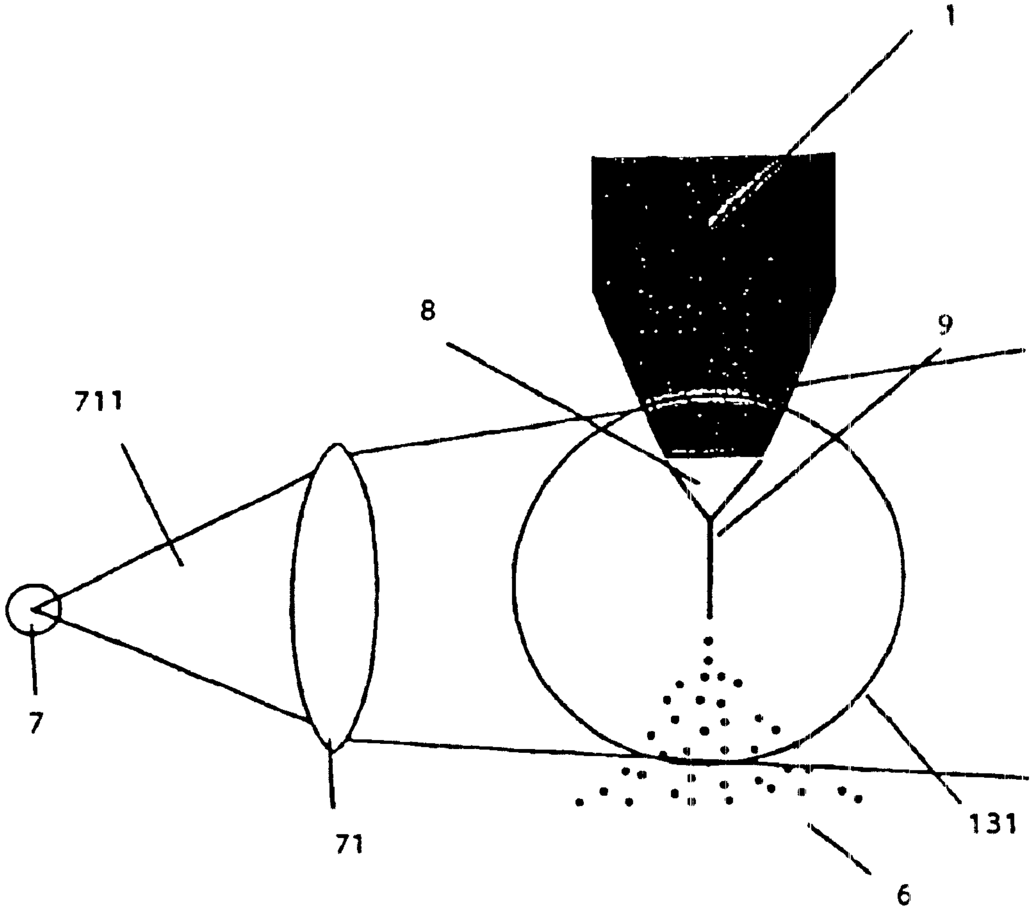
FIG. 11A Depicts the positioning of the illumination region and the camera field of view relative to the nozzle and spray for the static control system according to the invention of Example #1 as viewed from above. The entire field of view of the camera system is illuminated.

As shown in FIG. 11A, light from an appropriate source is focused so that an intense beam of light illuminates the entire field of view as imaged by the camera system. A lens system of appropriate focal length is used to focus the light into an approximately parallel bundle of rays with a diameter at least as large as the camera's field of view that is in the plane of the nozzle and is preferably perpendicular to the axis of the nozzle.

Figure 11B:
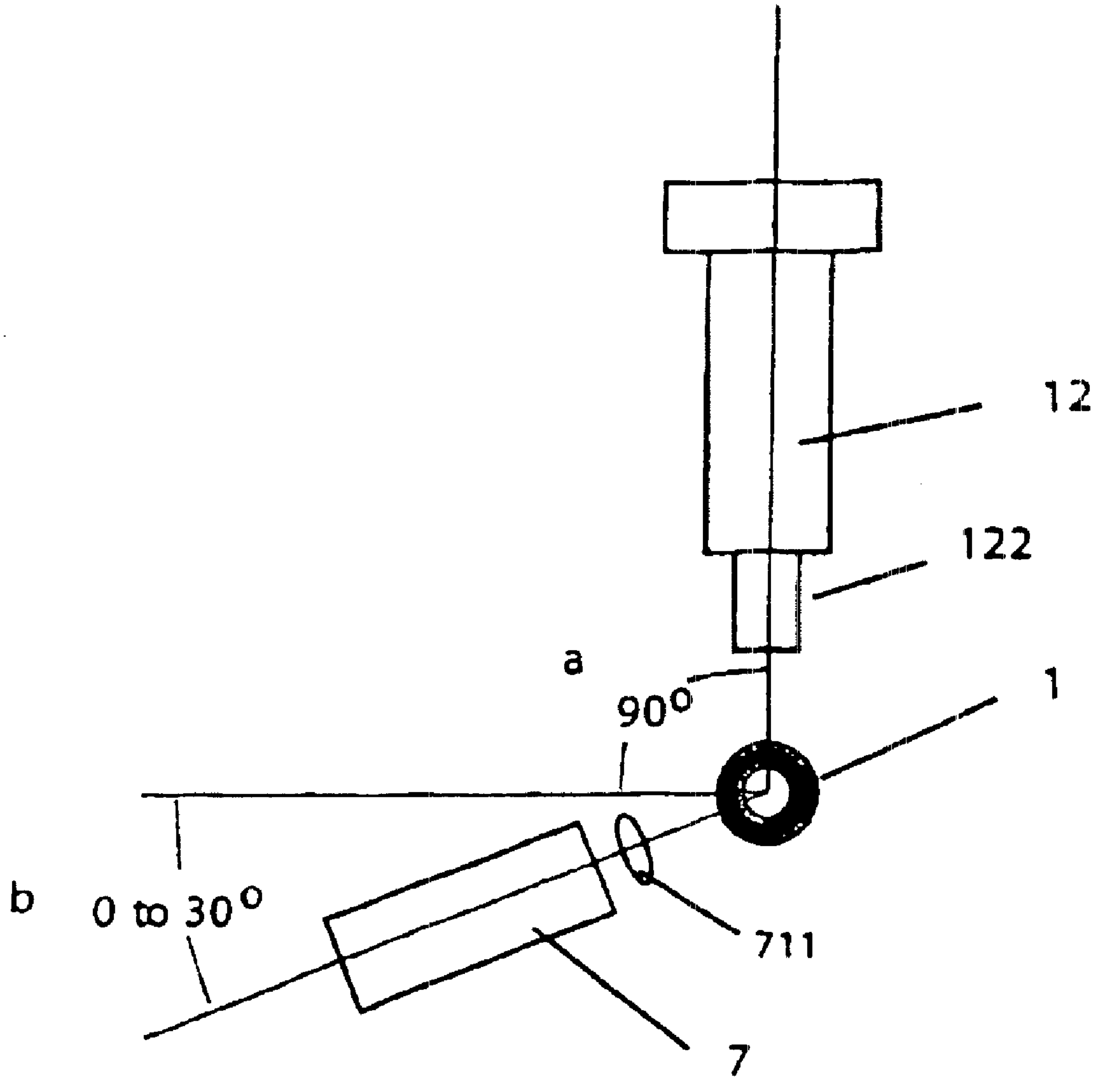
FIG. 11B Depicts a static control system of the present invention of example #1 as viewed down the axis of the capillary nozzle. The illuminator is positioned approx. 110 degrees below the microscope optic axis, yielding "dark field" illumination. The microscope only sees light that is scattered from the source for optimal contrast.
Figure 11C:
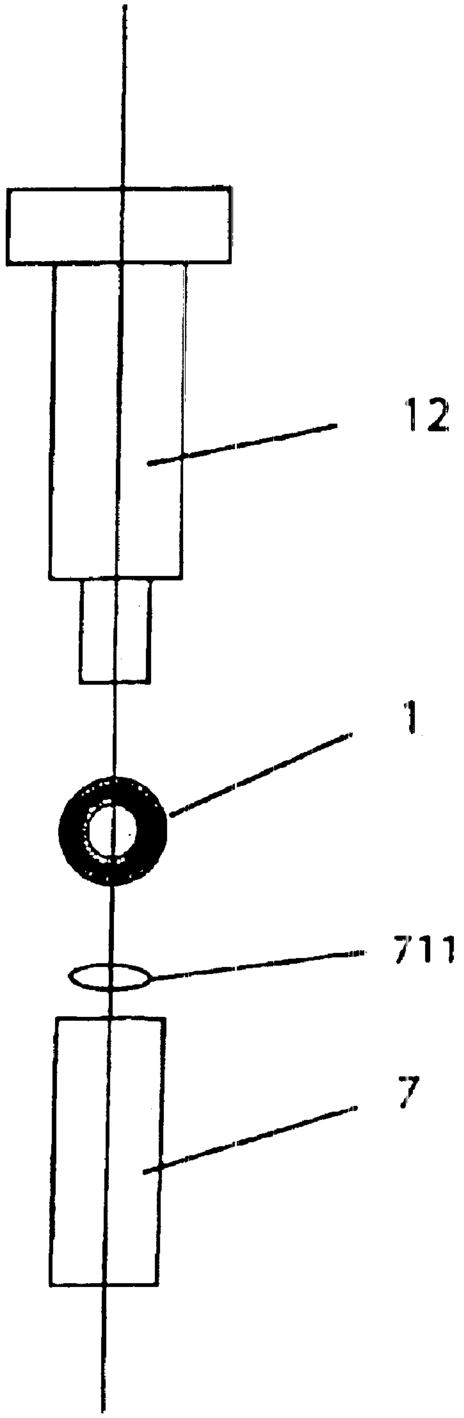
FIG. 11C Depicts a static control system of the present invention as viewed down the axis of the capillary nozzle.

As shown in FIG. 11B, preferably the angle of the incoming light beam relative to the optic axis of the imaging system should be adjusted so as to maximize the intensity of the light scattered by the aerosol while minimizing the intensity of the background illumination. In practice angles from 90 to 160 degrees have proven suitable, with a range of 100 to 130 degrees being preferred, and angles from 110 to 120 degrees especially preferred. Alternatively, as shown in FIG. 11C the light could be set up for transmitted light illumination. With this configuration the ability to image the droplet and spindle modes is improved, but imaging of the aerosol plume is diminished.

FIG. 12 is a block diagram of the basic control system based on image processing of image provided by the video microscope system. For spray mode control using empirical measurement, the spray mode algorithm must be able to make quantitative measurements of the image to a priori determine the spray mode. In Example 1 below, the algorithm for mode determination is based upon analysis of image morphology. The algorithm works by dividing the image into regions of interest, as shown in FIG. 13, (ROI) and determining the number of edges within each ROI. Table 1 below shows the number of edges found in each zone when the spray is illuminated from below so that the spray plume appears white on a dark background. Since continuous, rather than pulsed illumination is used in this example, it is unable to readily distinguish between the spindle and pulsed cone-jet modes. Fortunately this does not prohibit the system from finding and maintaining the desirable cone-jet mode. Based upon the number of edges found in each ROI, the voltage is either increased, decreased, or left unchanged. In example 1 the control algorithm is designed to generate and maintain the cone-jet mode of operation. It could be modified so as to maintain other modes, such as controlling the number of jets in the multi-jet mode.

TABLE 1

The number of edges found in each ROI when the spray is illuminated with a continuous source of light

| Mode | Number of Edges in Zone 1 | 2 | 3 | 4 |
|---|---|---|---|---|
| Drip | 2 | 2 | 0 | 0 |
| Spindle | 2 | 2 | 2 | 2 |
| Pulsed cone-jet | 2 | 2 | 2 | 2 |
| Cone-jet | 2 | 2 | 0 or >2 | 0 or >2 |
| Multi-jet | >2 | >2 | 0 or >2 | 0 or >2 |

In variation 4 of example 1 below, the edge detection algorithm is replaced with a pattern-matching algorithm. In this approach, the obtained spray image is compared to a library of reference images, and the best match is found. Based upon the best match the voltage is either increased, decreased, or left unchanged. This algorithm could be tailored to maintain any of the desired spray modes. For this system to work the library of modes must first be constructed so that the mode detection algorithm can make a quantitative comparison. Many variations of the foregoing basic system are possible according to the invention, involving different mobile phase delivery systems, different sizes and types of capillary nozzle, different types of illumination, and different implementations of the mode determination and control algorithm. It is also possible to control the strength of the electric field at the nozzle by leaving the voltage fixed and varying the distance between the nozzle and counter-electrode.

This system will work if the high voltage is placed directly in contact to an electrically conductive nozzle. Also suitable are configurations where the high voltage is placed on the counter-electrode and where the nozzle is left at ground potential. Electrical contact may also be made in a "junction" style arrangement where the voltage contact is made directly with the mobile phase through an electrode placed up-stream of the nozzle, enabling the use of electrically non-conductive nozzles. Suitable nozzles include those fabricated from: metals such as steel, stainless steel, platinum, and gold; from insulators such as fused-silica, glass; from metal coated fused-silica or glass; polymers such as polypropylene and polyethylene, conductive polymers such as polyanaline and carbon loaded polyethylene. Suitable nozzles may vary widely in inner diameter (ID), outer diameter (OD) and taper geometry. OD's, with appropriately corresponding ID's may range anywhere from 1–10 mm to 1–10 $\mu$m and anywhere in between. Nozzles with an OD of less than 1 mm being preferred, with those less than 200 $\mu$m being more preferred, and those in the range of 0.1 to 100 $\mu$m being especially preferred.

Suitable imaging detectors for this system include digital imaging cameras with charge-coupled device (CCD), charge injection device (CID), and complimentary metal oxide (CMOS) based detectors. Also suitable are many types of analog imaging video cameras such as those based on vidicon tubes or those utilizing microchannel plate based image intensifier tubes. Suitable cameras may be of the type to operate at conventional video rates, or those that operate in a "slow scan" mode operating much like digital photographic film. Also suitable are cameras capable of taking very short (0.1 to 10 $\mu$S) exposures, which can in some instances replace the use of pulsed illumination. Suitable manners of interfacing the camera to the computer includes the use of frame grabbers for video rate cameras, network interfacing, direct digital interface methods.

Suitable lens systems for the camera include conventional or zoom macro-lens or microscope optics. An optimal lens system is one wherein the field of view imaged by the camera includes the end of the nozzle, the entire region of the spindle, cone, jet, and a portion of the aerosol plume. A wide variety of magnifications are possible and the best choice needs to be tailored for the specific nozzle geometry. The optimal field of view is directly proportional to the size of the nozzle and the flow rate of the mobile phase.

Suitable sources for continuous illumination include light from a Mercury or Xenon arc lamp, conventional tungsten halogen lamp and light from a laser. The types of laser that are suitable include solid state diode lasers and gas lasers such as Helium-Neon, or Argon, operating at wavelengths suitable for the photo-detector. Light in the UV, Visible, and near-infrared wavelengths are all suitable, with light in the visible (300–700 nm) and near-infrared (700–1500 nm) being preferred. Suitable sources for pulsed, or strobed illumination include quartz flash lamps, pulsed lasers such a Titanium Sapphire or dye lasers, pulsed solid state diode lasers, and pulsed light emitting diodes (LED's).

Light may also be delivered from a single mode or multi-mode optical fiber or fiber bundle. The use of optical fiber is especially convenient since it permits the light source to be far removed from the spray apparatus. Particularly useful are diode lasers that are directly coupled with optical fiber in a "pig-tail" arrangement. This enables a more compact and efficient mechanical design. Using optical fibers to deliver light also permits ready implementation for the creation of a fiber array. Delivering light from multiple fibers permits multiple regions of the cone, jet, and plume regions to be probed simultaneously. The light from the various sources may be focused with conventional refractive glass or plastic lenses, they may also be focused with diffractive or Fresnel optics. Using diffractive optics enables a great degree of control of where the light interacts with the spray, and enables the creation of a "sheet" of light to probe many regions of the spray simultaneously.

EXAMPLE 1

A tapered, metal coated fused-silica capillary nozzle, fabricated from 360 $\mu$m OD×75 $\mu$m ID tubing and having a 30 $\mu$m OD tip, was connected to a syringe pump delivering mobile phase (aqueous solution of 50% Methanol, 2% Acetic Acid) at a flow rate between 100 nL/min to 2 $\mu$L/min. The output (0–5 kV) of a computer controlled high voltage (HV) power supply was connected to the metal coating on the nozzle. The nozzle was positioned perpendicular to a 1 cm diameter metal "ground plate" connected to ground potential. The distance between the plate and capillary nozzle was adjustable between 1 to 20 mm.

A CCD camera based microscope (magnification approx. 100×) was positioned above the capillary nozzle to provide an image of the capillary nozzle and resultant aerosol plume.

The output of the CCD camera was connected to an image acquisition card resident within the same computer controlling the HV power supply. Below the capillary nozzle, and at an angle of approximately 20 degrees, a fiber optic bundle delivered approximately 150 W of light from a tungsten lamp illuminator to illuminate the capillary nozzle and plume. This illumination system yielded a dark background, with the spray plume visible as scattered white light.

A program containing code to continually analyze the image data generated by the CCD camera and to control the HV power supply in real-time was installed and run on the control computer. Said program contained an algorithm to determine the presence and type of electrospray plume within the image and to adjust the spray voltage to compensate for unfavorable conditions. Said algorithm consisted of acquiring an image and dividing the image area into four distinct regions and was capable of determining the presence of "bright" areas in the image corresponding to the light scattered by the electrospray plume if present. These four areas were defined as parallel lines that were perpendicular to the axis of the capillary nozzle. Each area utilized an edge detection algorithm to determine the number of edges (light to dark transitions) contained within each area. Zone 1 was closest to the nozzle and zone 4 was the furthest. By counting the number of edges within each zone the particular mode of electrospray could be established. Optimal spray conditions for the desirable "cone-jet" mode were empirically determined to yield 2 edges in zones 1 and 2, and no edges (i.e. background noise) in zones 3 and 4, meaning that the operating voltage was correct. If zones 3 or 4 detected two edges then the operating voltage was determined to be too low and the voltage was increased. If more than two edges were detected in zones 1 or 2 then the operating voltage was determined to be too high and was decreased.

After starting liquid flow at a rate of 250 nL/min with the syringe pump, the computer system was initialized to begin a sequence to establish a stable electrospray. The HV was initially set to 1000 V and the first image was acquired. Using the above algorithm, if no edges were detected in zones 1 and 2 the voltage was increased by 200 V and another image was acquired. This process was repeated until 2 edges were established in zones 1 and 2. After the start-up phase the above algorithm was used to analyze all four zones. Images were acquired and analyzed at a rate of approximately 2 images per second. For this "fine tune" phase voltage was adjusted in 50 V increments to maintain the conditions for optimal spray. With the tip positioned approximately 5 mm from the ground plate a stable spray was established and maintained at 1400 V.

Increasing the flow rate to 2 $\mu$L/min resulted in an increase in the operating voltage. As the flow rate increased the droplets emitting from the tip became larger, creating a stream of droplets known as the "dripping or spindle mode", that were detected in zones 3 and 4 as edges. For each image acquired, having 2 edges in zones 3 and 4, the operating voltage was increased by 50 V. After approximately 30 seconds of acquisition, the voltage was raised to 2100 V and the large droplets were no longer detected in zones 3 and 4, returning the plume to the cone-jet mode.

Decreasing the flow rate to 100 nL/min resulted in a decrease in the operating voltage. As the flow rate diminished, the single cone-jet mode transformed to the multi-jet mode. The multi-jet mode was detected by the algorithm as more than 2 edges in either zones 1 or which resulted in a decrease in operating voltage by 50 V. After approximately 4 minutes, the flow rate stabilized and the operating voltage was reduced 1600 V, returning the plume to the cone-jet mode.

The system was capable of repeated changes in flow rate and adjusting the spray voltage to optimal conditions over the period of several hours of continuous operation.

EXAMPLE 2

The apparatus of example 1 was modified so that the syringe pump was replaced with a gradient liquid chromatography (LC) system. This system enabled the mobile phase composition to be varied during the course of the run. Solvent A consisted of an aqueous solution of 10% acetonitrile and 0.1% formic acid. Solvent B consisted of an aqueous solution of 90% acetonitrile and 0.1% formic acid. The liquid chromatography system could adjust the mobile phase composition to be any combination of the two solvents, and could create a linear gradient in composition from solvent A to B in any time scale between 1 and 300 minutes.

The flow rate was kept constant at 500 nL/min and the LC system was set to deliver solvent A. The computer control system was initialized and a stable cone-jet mode was established and maintained at 2100 V. The composition of the mobile phase was changed in a linear fashion to solvent B over the course of 10 minutes. As the mobile phase changed in composition to a higher percentage of acetonitrile the surface tension became lower and lower. At any given point, the cone-jet mode could change to the multi-jet mode, resulting in more than 2 edges in zones 1 and 2. Each time an image was acquired with this result, the operating voltage was decreased by 50 V. Thus as the mobile phase changed composition, the spray would be in the cone-jet mode for more than 90% of the time, only being in the multi-jet mode for one or more image acquisition periods. At the end of the gradient, a stable cone-jet mode was maintained at 1700 V.

The mobile phase composition could be changed at will, with the system continuously responding to maintain the cone-jet mode.

Variation 1

The method and apparatus of examples 1 or 2 could be further refined to include information concerning the distance between the edges found in each zone. This distance information further defines each of the possible electrospray modes and gives an indication as to how far the current operating conditions are from the optimal cone-jet mode. In the case of additional edges found in zone 1 or 2 which would result from the multi-jet mode, the farther apart the jets, the farther the correct operating voltage would be from the optimal cone-jet mode. Thus a farther distance of edges as measured in zones 1 or 2 would require a greater decrease in operating voltage. This system would likely respond much faster to changes in flow rate or composition by coming to the cone-jet operating voltage in a fewer number of cycles.

Variation 2

The physical apparatus of example 1 would be left intact but the computer program would be modified and a pattern-matching algorithm substituted for the edge detection algorithm. Before the control system could be utilized, the pattern-matching algorithm would require the acquisition of a library of reference images for each of the common modes of electrospray plume behavior for a given capillary nozzle. This library of images would be acquired at various flow rates and voltages so as to represent a reasonable sum total of the modes that could be possible with the given capillary nozzle and mobile phase. Each reference image would be assigned an index value that represented the required change in voltage to bring that mode closer to the desired cone-jet mode. Those images corresponding to the cone-jet mode would be given an index value of zero. Those images that corresponded to the dripping, and spindle modes would be given a positive index value. The images corresponding to the pulsed cone-jet mode would be given a negative index value. Those images that corresponded to the multi-jet modes would be given a negative index value.

The image pattern matching control system would first acquire an image from the CCD camera. Image parameters such as contrast, intensity and gamma would be adjusted to maximize the quality of the image content. The acquired image would then be compared to each of the library images using a normalized spatial domain cross-correlation scheme, a well-established image comparison method known to those skilled in the art. The index value of the reference image with the highest correlation coefficient value would then be used to effect the control voltage.

The pattern-matching algorithm would replace the edge detection algorithm in the control system. Operation in a continuous control system would be otherwise very similar to example 1.

Variation 3

The system of variation 2 could be modified to utilize a different pattern-matching algorithm. Instead of utilizing a spatial domain cross-correlation scheme, image correlation could be carried out in the frequency domain by utilizing the fast-Fourier Transfrom (FFT) of the test and library images.

Variation 4

The system of variation 3 could be modified to utilize a different pattern-matching algorithm. Instead of utilizing a spatial domain cross-correlation scheme, image correlation is carried using correlation techniques that incorporate "image understanding" techniques to interpret the information in each reference image and then use that information to find the reference image in the test image. The "image understanding" techniques include geometric modeling and non-uniform image sampling.

Variation 5

The system of example 1 could be modified so that illumination comes from an intense 10 mW diode laser beam operating at 670 nm focused so as to fully illuminate the desired area of the electrospray plume, an area of approximately 2 $mm^2$.

Variation 6

Utilizing the illumination scheme of variation 5 and the image correlation algorithm of variation 4, a pulsed laser could be used, with a pulse width ranging from 0.1–1 $\mu$S to provide a freeze-frame image of the spray on the CCD camera. This method would produce images that are much sharper and offer a better definition of the spray mode than those from the continuous illumination system. To further improve image S/N images from multiple exposures could be averaged. This approach works with both the edge detection and pattern matching algorithms of examples 1 and variation 4.

Variation 7

The system of variation 6 could be modified and the pulsed laser system replaced by a white light strobed quartz flash lamp with a flash duration of approx. 0.1–1 $\mu$S.

Variation 8

The apparatus of example 1 could be modified so that the conventional CCD camera is replaced with a unit capable of extremely short exposure times, on the order of 1–10 $\mu$S. This system is an alternative method to using a pulsed light source for obtaining freeze-frame images of the spray mode.

Dynamic Control System

Perhaps the simplest implementation of a dynamic spray mode control system involves the use of an illuminator/photo-tedector to probe the temporal spray dynamics in the cone, jet, and/or plume regions as shown in FIG. 14. A source of suitable illumination is provided so that the photo-detector(s) relate signal to an acquisition computer containing an algorithm to characterize the spray mode either through direct empirical measurements or through comparative analysis. This system forms the core of a feedback loop in which a control algorithm adjusts an experimental parameter so that a particular spray mode is obtained and maintained.

As shown in FIGS. 14 and 16, the basic requirements for such a dynamic control system include: Computer controlled high voltage power supply, a suitable light source (or sources) for illumination, a photo-detector and signal conditioning amplifier, a computer for digital signal acquisition, a suitable signal analysis algorithm to determine the spray mode, and a suitable control algorithm to maintain the desired spray mode.

FIG. 15 shows the relationship between the illuminator and the photo-detector relative to the axis of the capillary nozzle. FIGS. 24A (top view) and 24B (view along the nozzle axis) show a detailed schematic in which a focused beam of light is positioned to intersect the jet or the cone-jet region relative to the nozzle. The photo-detector is positioned approx. 180° in-line with the focused beam. FIG. 16 shows a block diagram of the basic dynamic control system.

For example 3, the control algorithm relies on the dominant frequency component present in the photodiode signal to make a decision as to the required operating voltage for mode control. This system operates in an empirical fashion where the highest possible fundamental frequency is maintained during operation. In variation 3 of example 3, the empirical frequency algorithm is replaced with a pattern-matching algorithm in which the system is first trained with a set of reference waveforms corresponding to each of the spray modes. These systems are analogous to the edge detection and pattern matching algorithms of the static control system.

Many variations of basic system are possible, involving different mobile phase delivery systems, different sizes and types of capillary nozzle, different types of illumination, and different implementations of the mode determination and control algorithm. Many of the variations in nozzle design and high voltage application suitable for the static control system also apply to the dynamic control system.

Suitable illumination sources include light from a Mercury or Xenon arc lamp, conventional tungsten halogen lamp and light from a laser. The types of laser that are suitable include solid state diode lasers and gas lasers such as Helium-Neon, or Argon, operating at wavelengths suitable for the photo-detector. Light in the UV, Visible, and near-infrared wavelengths are all suitable, with light in the visible (300–700 nm) and near-infrared (700–1500 nm) being preferred. Light may also be delivered from a single mode or multi-mode optical fiber or fiber bundle as shown in FIG. 27. The use of optical fiber is especially convenient since it permits the light source to be far removed from the spray apparatus. Particularly useful are diode lasers that are directly coupled with optical fiber in a "pig-tail" arrangement. This enables a more compact and efficient mechanical design. Using optical fibers to deliver light also permits ready implementation for the creation of a fiber array. Delivering light from multiple fibers permits multiple regions of the cone, jet, and plume regions to be probed simultaneously as shown in FIG. 28. The light from the various sources may be focused with conventional refractive glass or plastic lenses, they may also be focused with diffractive or Fresnel optics. Using diffractive optics enables a great degree of control of where the light interacts with the spray, and enables the creation of a "sheet" of light to probe many regions of the spray simultaneously.

As shown in FIGS. 15, 24A and 24B, a lens system of appropriate focal length is used to focus the light (e.g. a laser beam) to a diffraction limited spot. The incoming beam is in the plane of the nozzle and is perpendicular to the axis of the nozzle. The focal point of the beam is positioned to be coincident with the jet of liquid emerging from the nozzle. The precise location is determined by varying the beam position or nozzle position so that the signal amplitude at the photo-detector is maximized. Generally the smaller the size of the focused spot, the higher the signal intensity at the detector. As the spot size is diminished the precision required in positioning is increased however.

Many specific geometries for illumination and detection are suitable, but as shown in FIGS. 24A and 24B, one preferred embodiment uses a con-focal optical arrangement, in which the focused cone of light from the source and point, or pin hole, photo-detector are coincident. The use of a con-focal illumination and detection system serves to increase the signal to noise at the detector by rejecting light from focal planes not coincident with the focal point.

In another embodiment of con-focal illumination as shown in FIG. 25, the source and detector share a common optical path in an epi-illumination scheme, a method well known to those skilled in the art of con-focal optics. In the epi-illumination scheme the lens focusing the light from the illumination also collects the scattered light for delivery to the detector. The source and detector are placed on the same side of the lens and a beam splitter is used to send collected light to the detector.

Suitable photo-detectors include photovoltaic devices such as conventional silicon PIN photodiodes, Indium-Gallium-Arsenide (InGaAs) photodiodes, Gallium-Arsenide (GaAs) photodiodes. Variations such as reversed bias photodiodes and avalanche photodiodes are also suitable. Photoemissive detectors such as vacuum avalanche photodiodes, and photo-multiplier tubes are also suitable.

EXAMPLE 3

Dynamic Control

A tapered, metal coated fused-silica capillary needle would be connected to a syringe pump delivering mobile phase at a flow rate between 100 nL/min to 2 $\mu$L/min. The output of a computer controlled high voltage (HV) power supply (0–5 kV) would be connected to the metal coating on the needle. The needle would be positioned perpendicular to a metal "ground plate" connected to ground potential. The distance between the plate and capillary needle would be adjustable between 1 to 20 mm.

The output of a diode laser beam, operating at 670 nm, would be focused through a lens system incorporating a 5× microscope objective. The beam would be positioned perpendicular to both the capillary needle as well as the optic axis of the CCD based microscope, and the focal point would be adjusted to intersect the spray just beyond the end of the capillary nozzle in the direct vicinity of the cone-jet region. The beam would be tightly focused so that if the multi-jet mode were to occur, no detectable amount of light would be scattered. A fast silicon PIN photodiode detector and amplifier, with a 10 nS time constant, would be placed opposite the laser to collect scattered and transmitted radiation from the laser beam-plume interaction. The output of the photodiode amplifier would be fed into a digital oscilloscope having a 100 MHz bandwidth for signal amplification and conditioning. The oscilloscope would be connected to the HV control computer via a general-purpose interface bus (GPIB) interface.

A program containing code to continually analyze data generated by the oscilloscope and to control the HV power supply in real-time would be run on the control computer. Said program would contain an algorithm to determine the presence and type of spray mode based on the frequency data generated by the oscilloscope. Said algorithm would consist of acquiring a data stream from the oscilloscope for a fixed block of time, typically for 1–100 mS. Said data stream would be converted from the time domain to the frequency domain utilizing fast the Fourier Transform (FFT). The obtained frequency spectrum would then be analyzed for frequency components having signal-to-noise above a user defined criterion threshold. The dominant frequency component of the spectrum would be used as an indicator of the electrospray mode. The goal of the control algorithm would be to operate the electrospray to yield signal at the highest possible observable frequency at a given flow rate. This analysis and control algorithm would yields a system that creates and maintains a pulsed cone-jet mode having a very high oscillation frequency.

To operate as a closed loop control system, the algorithm would first carry out a self-calibration run to best determine the operating voltage limits for a given combination of capillary nozzle and mobile phase. At the initialization of the control algorithm, the HV voltage would be set at 1000 and after a user defined delay period of 0.1 to 1 second, the frequency spectrum would be acquired. The voltage would be increased by 50 to 100 V and another frequency spectrum would be acquired. This process would be repeated until an increase in the fundamental dominant frequency was no longer observable. The voltage would then set at the value of the highest measured frequency, which is then defined as the reference frequency.

Once the initialization routine is finished, the algorithm would switch to a fine-tune mode wherein said reference frequency would be maintained during the course of the run. If the observed frequency should fall below a threshold value, the voltage would be increased by 10V and another frequency spectrum obtained. If no suitable frequency values were to be observed in the spectrum, the operating voltage would be reduced by 10 V and another frequency spectrum was obtained. If, after reducing the voltage by 200 V, no suitable frequency values were to be obtained, the algorithm would switch to the initialization mode to re-establish a suitable spray. If a frequency higher than the reference frequency were to observed, the operating voltage would be increased by 10 V and the new higher frequency value would become the reference frequency.

EXAMPLE 3

Variation 1

The apparatus of example 3 could be modified so that the oscilloscope is replaced with a digital acquisition board inside the control computer.

EXAMPLE 3

Variation 2

The apparatus of example 3 can be modified so that the syringe pump was replaced with a gradient liquid chromatography (LC) system. This system enables the mobile phase composition to be varied during the course of the run.

EXAMPLE 3

Variation 3

The physical apparatus of example 3 can be modified so that the laser beam covered an area suitable for the detection of the frequency components for all of the electrospray modes, including the multi-jet mode of operation. The computer program can be modified and a pattern-matching algorithm substituted for the dominant frequency algorithm. Rather than being sensitive to the absolute observable frequency in a given spectrum, this algorithm relies on the pattern contained in the frequency spectrum.

Before the control system can be utilized, a pattern matching algorithm wold require the acquisition of a library of reference frequency spectra for each of the common modes of electrospray plume behavior for a given capillary needle. This library, if acquired at various flow rates and voltages, would represent a reasonable sum total of the modes that could be possible with the given capillary needle and mobile phase. Each reference spectra would be assigned an index value that represented the required change in voltage to bring that mode closer to the desired cone-jet mode. Those spectra corresponding to the cone-jet mode would be given an index value of zero. Since the pure cone-jet mode shows little oscillation these frequency spectra would contain little information. Those spectra corresponding to the dripping and spindle modes would be given an index value of +25. Those spectra that corresponded to the multi-jet modes would be given an index value of −25.

The spectra pattern matching control system would first acquire a spectrum from the oscilloscope. The acquired spectrum would then compared to each of the library images using a normalized cross-correlation scheme, a well-established comparison method known to those skilled in the art of digital signal acquisition. The index value of the reference spectrum with the highest correlation coefficient value would then used to effect the control voltage.

The pattern-matching algorithm would replace the frequency component algorithm in the control system. Operation in a continuous control system is otherwise identical to implementation 1.

EXAMPLE 3

Variation 4

The apparatus of Example 3 could be modified so that the signal from the transmitted beam is coupled to the photodiode via optical fiber. A focusing lens would be used to collect light from the transmitted beam and efficiently couple light into the fiber.

EXAMPLE 3

Variation 5

The apparatus of Example 3 could be modified so that a second photodiode detector is placed adjacent to the first photodiode detector as shown in FIG. 26. The output amplifiers of each photodiode are then passed through a differential amplifier. The differential amplifier would then feed the oscilloscope. This arrangement would serve to (1) eliminate the noise inherent to the light source and (2) offers improved signal-to-noise for low amplitude signals. This would especially improve operation at low mobile-phase flow rates.

EXAMPLE 3

Variation 6

The apparatus of variation 5 could be modified so that a split, or segmented, photodiode would replace the two discrete photodiodes. The co-localization of the photodiodes would improve the common mode rejection response and would further reduce noise inherent to the light source.

Hybrid Control System

Each of the previously described general systems for static and dynamic control have limitations that are particularly well addressed by combining elements of each independent system. Put another way, each system has advantages that complement each other well.

The static control system and the dynamic control system each offer advantages not found in the other. Thus, the static control system is better suited for use with stable cone-jet forms of electrospray than the dynamic control system, since such modes generate little if any frequency information upon which the dynamic control system could act. On the other hand, the dynamic control system is very well suited for use with pulsed cone-jet modes of electrospray. Where the electrospray pattern generated has or might have aspects of both the stable and pulsed modes (i.e., modal ambiguity), a combination of the static and dynamic control systems is advantageous. Such a combined system removes ambiguity from the mode determination process, since each image acquired would have frequency information associated with it. A pulsed cone-jet mode would be readily distinguished from a stable cone-jet mode by such a system.

Using a static control system with continuous illumination as in static example 1, it can be difficult to distinguish between cone-jet modes pulsing at a high frequency and a truly stable cone-jet mode. With the dynamic control system of dynamic example 3 it can difficult to maintain a truly stable cone-jet mode since this mode has little, if any, frequency content. On the other hand, the dynamic system is particularly sensitive to the pulsed cone-jet modes. Thus a system combining elements of each, results in a mode control system that is avoids modal ambiguity.

Ambiguity is removed from the mode determination process since each image acquired would have frequency information associated with it. Thus a pulsed cone-jet mode, would be readily distinguished from a stable cone-jet mode.

There are a number of basic approaches to creating a hybrid system. The first is to create a simple "linear" combination of elements from the video camera based static control system of Example 1, with the photo-detector frequency measurement technique of the dynamic control system of Example 3 as shown in FIG. 17. FIG. 18 shows the relative position of the light sources and detectors in relation to the capillary nozzle axis. FIG. 19 shows a block diagram of the hybrid control system. The control algorithm uses information from both the image analysis system of the static system and the frequency information of the dynamic system.

FIG. 20 shows a schematic of a proposed hybrid system in which the frequency information from the photodiode is used to synchronize the pulse of light used to acquire the image at a particular point in time that is related to the spray event creating the pulse. The pulse and timing circuits for the strobed light source are external to the computer. FIG. 21 shows the relationship of the light sources and detectors for this implementation. In this preferred embodiment, the strobed light source is at 90 degrees to the focused light source providing the illumination for the photo-detector. This reduces the chance of cross talk between the two parts of the system. FIG. 22 shows the block diagram of the control system for this implementation. The control algorithm is able to take information from both the image analysis algorithm of the static system and the waveform analysis of the dynamic system and make decisions based on both channels of information. FIG. 23 shows a block diagram for another embodiment of the control system in which the pulse timing for the strobed illumination is controlled by the computer.

In another preferred embodiment of the hybrid system, the con-focal illumination and detection system utilized for dynamic detection would be scanned spatially, so as to build up an image of the spray pattern, a method well known to those skilled in the art of con-focal optics. In this embodiment of a hybrid system, no camera is used to directly generate an image of the spray. The focused spot from the dynamic system is scanned to build up an image of the spray point by point, and the image is reconstructed in a digital manner.

Con-focal illumination and optics are known from, for example, M. Minsky, 1957, U.S. Pat. No. 3,013,467.

A hybrid system could also be constructed by using one of the static embodiments described here, in combination with a prior art method based on spray or droplet characterization. For example, the static system of example 1 could be combined with PDA. The static analysis part of the system would alleviate the disadvantage of the PDA's limited sampling volume.

Each of these approaches serves to remove the modal ambiguity that can arise from each of the independent systems.

Although the specific examples cited here are to generate and control the cone-jet mode of electrospray, the analysis and control algorithms are readily modified to yield other spray modes. While the cone-jet mode is desireable for the applications involving LC-MS, for other applications operating in other modes can be advantageous. For example, the static method of example 1 is readily modified to yield the multi-jet mode so that a specific number of jets is always present at the outlet of the nozzle. Either the dynamic or hybrid systems are also suitable for controlling electrostatic spray or electrostatic droplet methods of dispensing fluids onto a solid substrate. The use of electrostatic fluid dispensing for the application of thin film coatings or deposits in both the spray mode and droplet mode are known from U.S. Pat. Nos. 5,326,598; 6,149,815 and U.S. patent application US2002/0003177 A1.

Referring now to the drawings, the static control embodiment of the present invention is shown in FIG. 10. As can be seen, capillary nozzle 1 is provided with mobile phase by mobile phase pump 2, which pumps the mobile phase through the capillary to discharge from the nozzle at opening 11. Electrical voltage is applied to capillary nozzle 1 by high voltage power supply 3 through electrode 4. A counter electrode 5, which can be incorporated into to the inlet of a mass spectrometer (not shown) is "grounded", i.e., is at ground potential, as shown. The voltage difference between capillary nozzle 1 and counter-electrode 5 causes the mobile phase being discharged to break up into a continuous stream of charged droplets 6, hereinafter referred to as an "electrospray". Light source 7 illuminates electrospray 6 with intense light, which is positioned and focused by lens 71 to optimize contrast and the scattering of light by the electrospray droplets. Electrospray 6 is imaged through microscope 12, having microscope lens 122, and the image is transmitted through CCD camera 13 to computer 14. Computer 14 analyzes the image of the electrospray, and adjusts the high voltage power supply 3 to increase or decrease the voltage applied to the capillary nozzle, as necessary to maintain the optimum electrospray configuration, or pattern.

FIG. 11A shows a magnification of the field of view 131 seen by the camera 13 of FIG. 10, through microscope 12. As can be seen, the electrospray initially is discharged from capillary nozzle 1 in the form of a jet, which then breaks up into an electrospray 6 in the pattern of a plume. As shown, light beam 711 is focused through lens 71 to illuminate the full field of view 131 of the camera.

The light source is preferably positioned below and at an angle a+b of from about 90° to 120° to the microscope optic axis, preferably at about 110. This produces a "dark field" illumination, as shown in FIG. 11B. As shown in FIG. 11B, the microscope thereby sees only light that has been scattered from the light source, for optimum control.

Where a "bright field" illumination is desired, the light source is positioned directly below the microscope. This provides a transmitted light view for the camera, as illustrated in FIG. 11C.

The static control system of the present invention utilizes a mode analysis algorithm and a mode control algorithm to adjust and control the electrospray configuration, as shown in the block diagram of FIG. 12. Computer 14 contains a suitable frame grabber 200, a contrast enhancement function 201, a mode analysis algorithm 202, a mode control algorithm 203, an interface 204 to power supply 3, and a video display 205. Test images generated by the camera 13 are digitized by the frame grabber 200, the image being stored in a memory location of computer 14. A contrast enhancement function 201 serves to optimize, normalize, and reduce noise in the signal levels of the image. The background of the image defined as the zero level, and the brightest level in the image is assigned as the maximal level. The enhanced image from function 201 is passed to the mode analysis algorithm 202, which makes a determination of the spray mode either based on empirical measurement or on comparing the test image to reference images in an image library. The mode information from 202 is passed to the control algorithm 203, which makes a determination as to whether the test image displays the desired spray mode. If the test image is determined to not be in the desired mode, algorithm 203 adjusts the voltage supplied to the capillary nozzle 1 by the power supply 3 through interface 204. The mode information is from 202 is also passed to video display 205, which shows the test image from 201 along with the results of the mode analysis algorithm 202. Another test image is then acquired by frame grabber 200, and the analysis and control process is repeated.

In a preferred embodiment the spray mode analysis algorithm makes quantitative measurements of the image to a prori determine the spray mode. This, for example, can be done by dividing the image into regions of interest (ROI). FIG. 13 depicts four different regions of interest, 20, 21, 22 and 23 at various discharge distances from the capillary nozzle 1. The algorithm then determines the number of edges within each region of interest. Based upon the number of edges found in each region of interest, the voltage is either increased, decreased or left unchanged. The embodiment illustrated in FIG. 13 shows a cone-jet-plume form of electrospray, wherein the mobile phase is initially discharged in the form of a cone 8, which then merges to form a jet 9 which then breaks-up into electrospray plume 6.

The dynamic control embodiment of the present invention is illustrated in FIG. 14. The light source 7 in this embodiment produces a tightly focused beam of light, such as from a laser, which is positioned to intersect the spray at a short distance from the nozzle. A photo-detector 32, such as, for example, a photo-diode, is used in place of the CCD Camera/microscope arrangement of FIG. 10. Any interruptions of the beam of light caused by liquid droplets will be detected by the photo-detector. The tighter the beam of light, the smaller the droplet size that can be detected. The signal from the photo-detector is transmitted to computer 14 and analyzed for frequency content through waveform analysis. A control algorithm makes any necessary adjustment to the high voltage power supply to optimize the incoming waveform signal.

The dynamic control system of the present invention utilizes a mode analysis algorithm and a mode control algorithm to adjust and control the electrospray configuration, as shown in the block diagram of FIG. 16. Computer 14 contains a analog-to-digital signal interface 300, a waveform analysis algorithm 301, a control algorithm 302, an interface 204 connected to power supply 3, and a parameter display 304. Waveform signal generated by the photo-detector 32, is amplified and conditioned by electronic circuit 305 to a level suitable for acquisition by interface 300. The test waveform acquired by 300 is analyzed by the waveform analysis algorithm 301. Waveform algorithm 301 makes a determination of the spray mode either based on fundamental frequency of the test waveform, the frequency spectrum of the test waveform, or by comparing the test waveform to a library of reference waveforms. The mode information from 301 is passed to the control algorithm 302, which makes a determination as to whether the test waveform is indeed representative of the desired spray mode. If the test waveform is determined to not be in the desired mode, algorithm 302 adjusts the voltage supplied to the capillary nozzle 1 by the power supply 3 through interface 204. The control information from 302 is also passed to parameter display 304, which shows the test waveform from 301 along with the results of the mode analysis algorithm 302. Another test waveform is sampled from interface 300, and the analysis and control process is repeated.

Such a hybrid system is provided by a "linear" combination of the elements of each, as shown in FIG. 17. As shown, the light source 7A for the static control system and 7B for the dynamic control system both illuminate the electrospray, and are detected by CCD camera/microscope (12, 13) and photo-detector (32) respectively. The signals from the CCD camera and from the photo detector are both sent to the computer, which then adjusts the high voltage power supply.

The hybrid control system analyzes the signals provided by both the CCD Camera and the photo-detector in the same way as each is analyzed in the static mode and dynamic mode, as previously described, but combines the analysis results in the control algorithm as shown in the block diagram of FIG. 19. Computer 14 contains both the image interface 200 and the waveform interface 300, as well as the image analysis algorithm 202 and the waveform analysis algorithm 301. The output of analysis algorithm 202 and 301 pass static and dynamic mode information to control algorithm 306. Algorithm 306 compares the static and dynamic mode information from algorithms 202 and 301, respectively. If the static and dynamic modes are identical then algorithm 306 compares this test mode to the desired spray mode. If the test mode is determined to not be in the desired mode, algorithm 306 adjusts the voltage supplied to the capillary nozzle 1 by the power supply 3 through interface 204. If the static and dynamic modes do not match, then algorithm 306 must decide which information channel (static or dynamic) is more accurate and make a decision based on the more accurate data channel. If at this point the test mode is determined to not be in the desired mode, algorithm 306 adjusts the voltage supplied to the capillary nozzle 1 by the power supply 3 through interface 204. Another test waveform and test image are sampled from interfaces 200 and 300, and the analysis and control process is repeated.

When the image and waveform modes do not match, there are a number of means for algorithm 306 to determine which is correct. In one preferred embodiment, algorithm 306 makes it's determination based on first evaluating the static mode value. If the static mode is determined to be the multi-jet mode, the dynamic mode information from algorithm 301 is ignored and the test mode value to set to that provided by 202. If the static mode is in either the spindle, pulsed cone-jet, or cone-jet modes, the static mode information from 202 is ignored and the test waveform is further evaluated by 306 for frequency content. If then there is no significant frequency content in the test waveform, then the spray mode must be the pure cone-jet mode and algorithm 306 sets the test mode to that provided by 202. If there is significant frequency content from the test waveform, then the mode is set to that determined by algorithm 301.

In a particularly preferred embodiment of the hybrid control system, the light source for the static imaging system is a strobed 7C with focusing optics 71C, or pulsed light source. The timing of the light pulses produced by the strobed is adjusted by Pulse, Timing and Phase Electronics 16 in response to the signal produced by the photo-detector 32, as shown in FIG. 20. The static control component is thus able to obtain time "frozen" images of the electrospray.

The hybrid control system incorporating a strobed light source is further illustrated in FIG. 21, which is a view of the system shown in FIG. 20, viewed down the axis of the nozzle 1.

FIG. 22 shows a block diagram of the hybrid control system from the apparatus of FIG. 20. In this embodiment, the signal supplied by the conditioning circuit 305 is fed to both computer 14 through interface 300 and to a pulse timing circuit 307. Circuit 307 controls the timing, phase and pulse duration of the strobed light source 308. The operation of the analysis and control algorithm is otherwise identical that attributed to FIG. 19. The strobed light source of 308 creates much sharper images that are acquired by camera 13 through microscope 12. Acquisition of the images by the image interface 200 is timed to coincide with the strobe output of 308 through waveform interface 300, which provides triggering information to 200.

Figure 1:
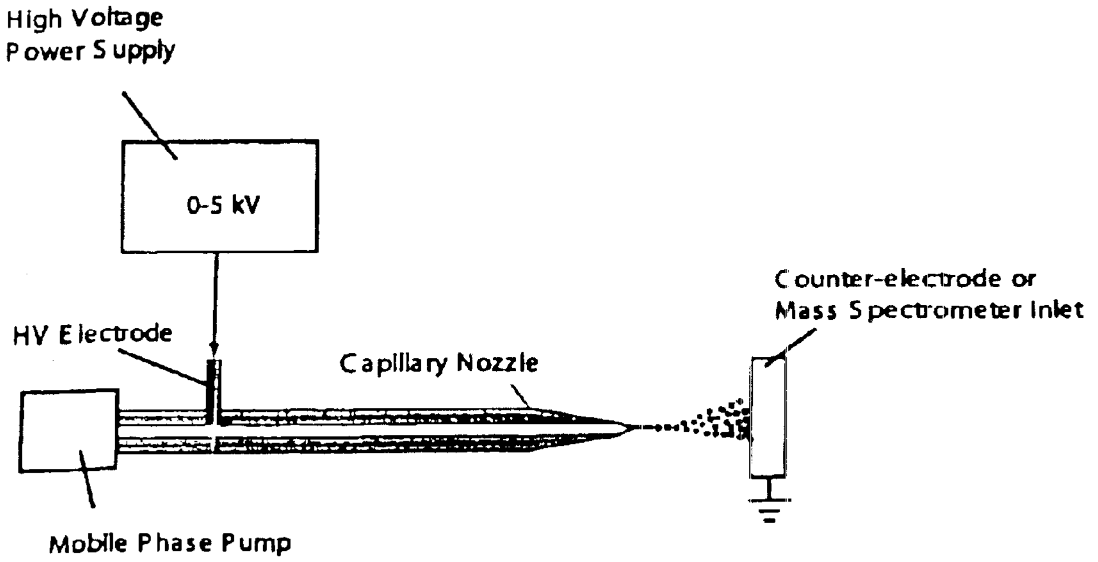
Figure 1 (prior art)
FIG. 1 (Prior Art) Depicts a basic electrospray system comprised of a nozzle, pump, power supply, and counter-electrode. Mobile phase pumped though the capillary is held at a high electrical potential relative to the counter-electrode. If the potential is above a threshold value, current will flow between the nozzle and counter-electrode in the from of droplets or an aerosol spray.
Figure 2:
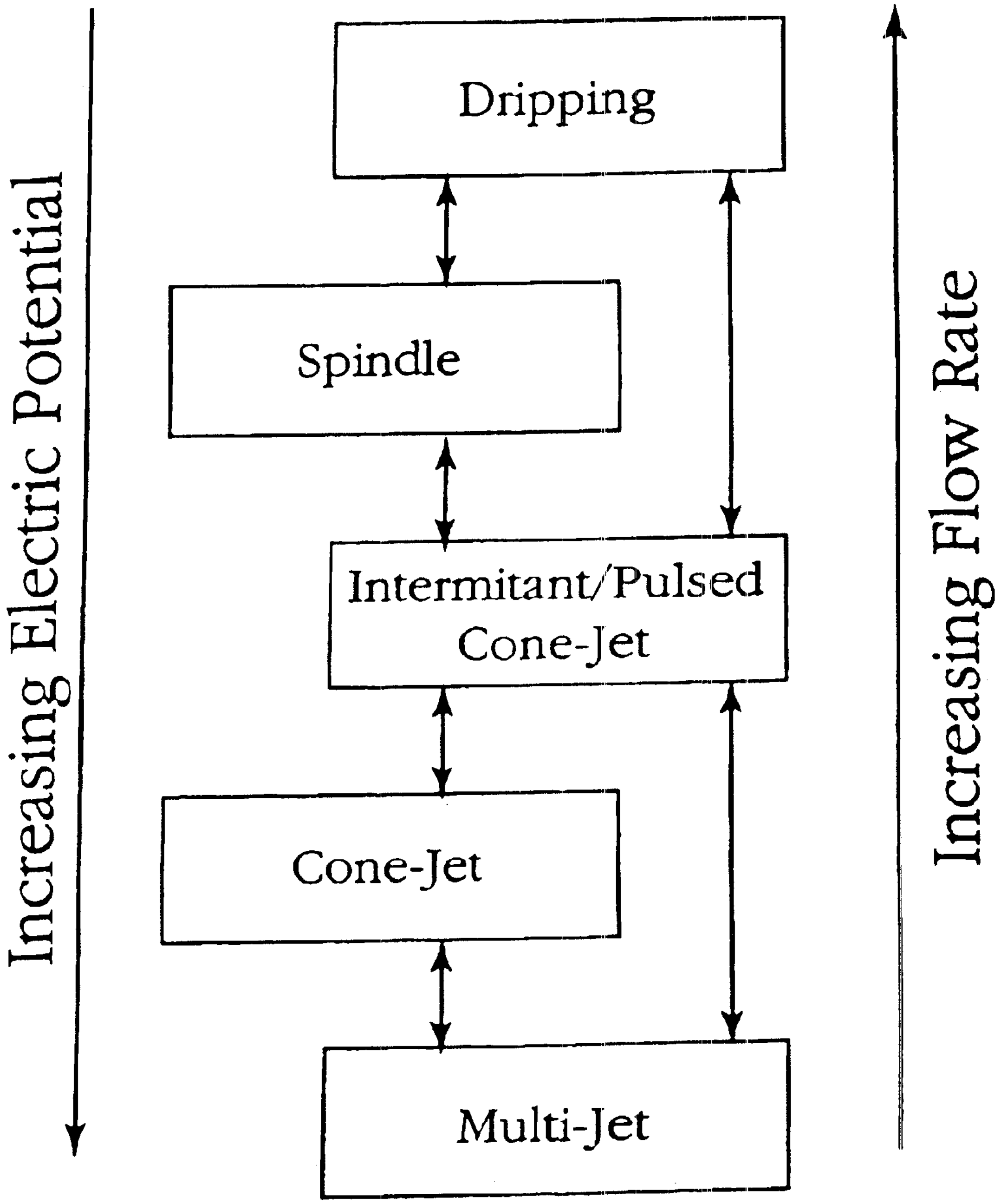
FIG. 2 Depicts the relationship between the various common spray modes that are possible with electrospray for an aqueous mobile phase. Increasing the electric field between the nozzle and counter-electrode has the opposite effect as increasing the flow rate. Some modes are not always observed for a given mobile phase, flow rate, or nozzle geometry. The dripping mode can go to the pulsed cone-jet mode without the spindle mode, for example.
Figure 3:
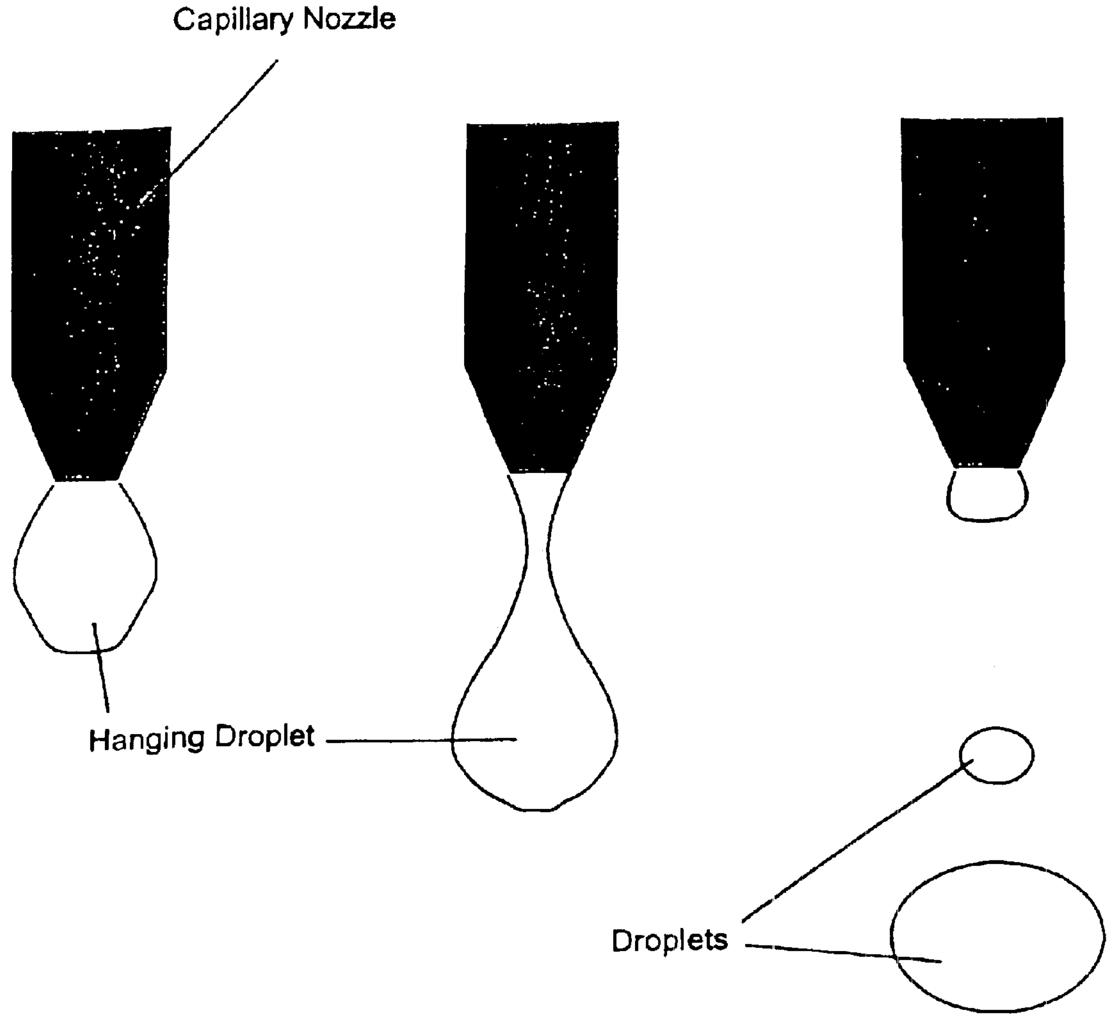
FIG. 3 Depicts the dripping mode. In this mode, there is a "time course" evolution of large droplets from the nozzle in the dripping mode. Large droplets of mobile phase are pulled off of the nozzle in a periodic fashion. No fine aerosol spray is generated in this mode.
Figure 4:
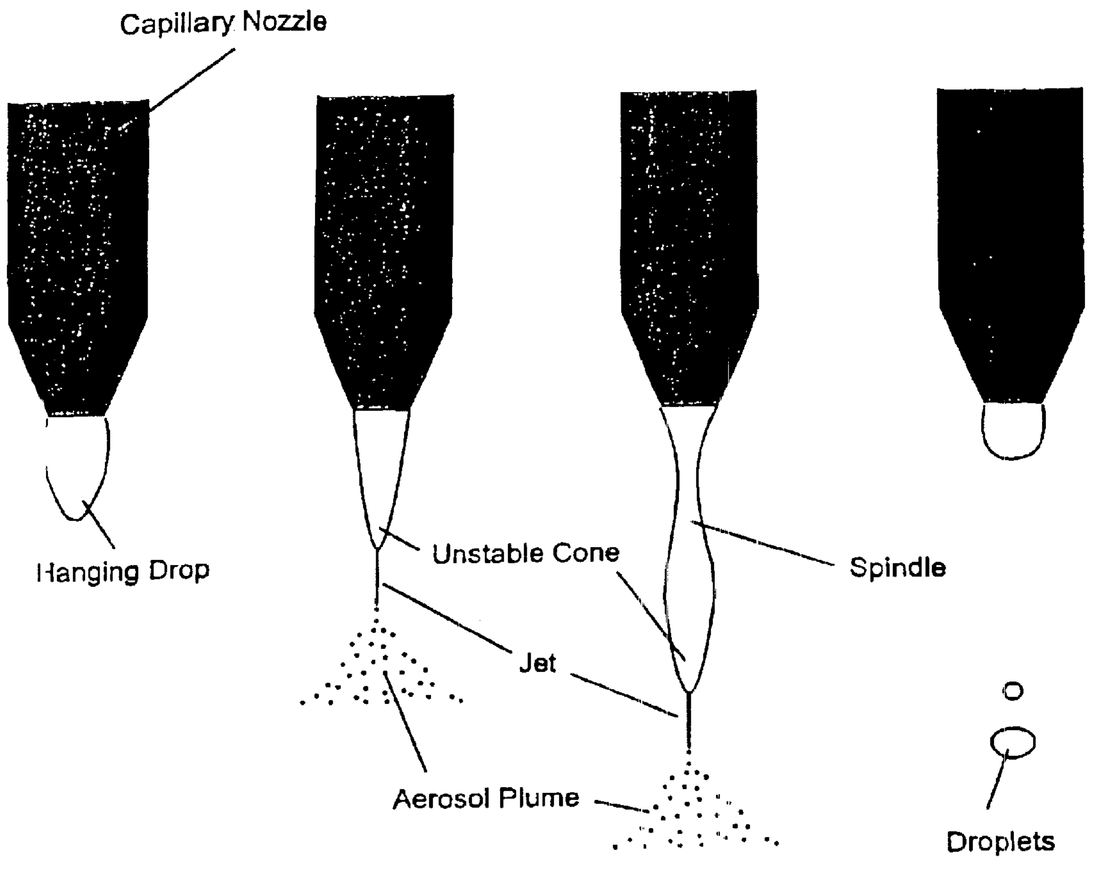
FIG. 4 Depicts the spindle mode. In this mode, there is a "time course" evolution of both large droplets and aerosol spray from the spindle mode. Large droplets are pulled off the nozzle with a temporary aerosol being formed between emitted droplets.
Figure 5:
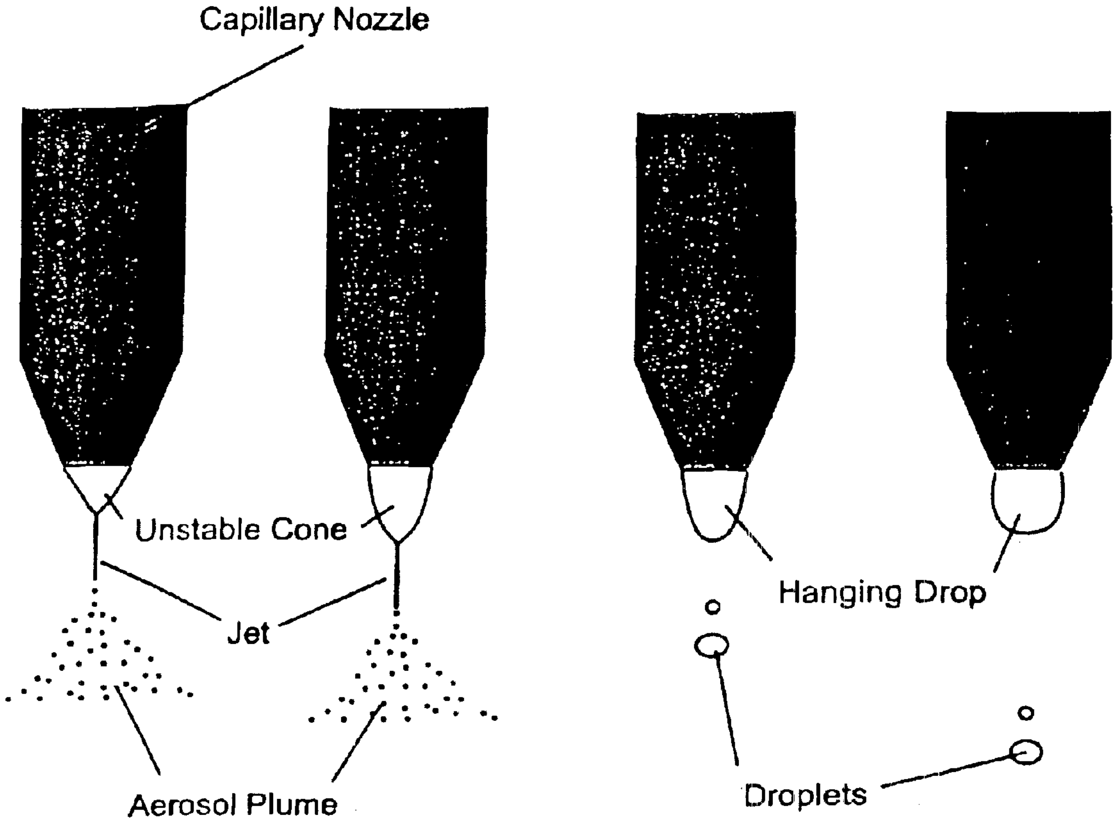
FIG. 5 Depicts the pulsed cone-jet mode. In this mode, there is a "time course" evolution of both small droplets and aerosol spray from the pulsed cone-jet mode. Droplets are pulled off the nozzle with a temporary cone-jet aerosol being formed between emitted droplets. This mode lacks the long liquid spindle of the spindle mode, and typically generates aerosol at a higher duty-rate than the spindle mode.
Figure 6:
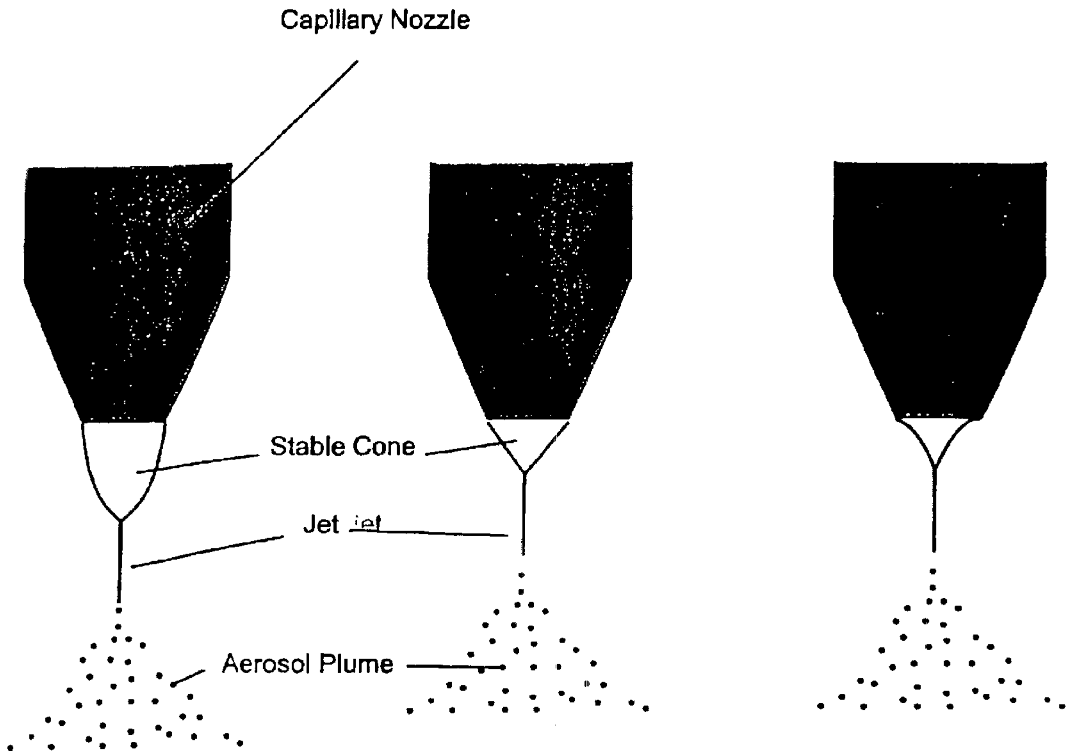
FIG. 6 Depicts three different examples of the stable cone-jet mode. There is no pulsed behavior in this mode, and aerosol plume is being formed with a 100% duty cycle. This is the desired mode for many applications of electrospray.
Figure 7:
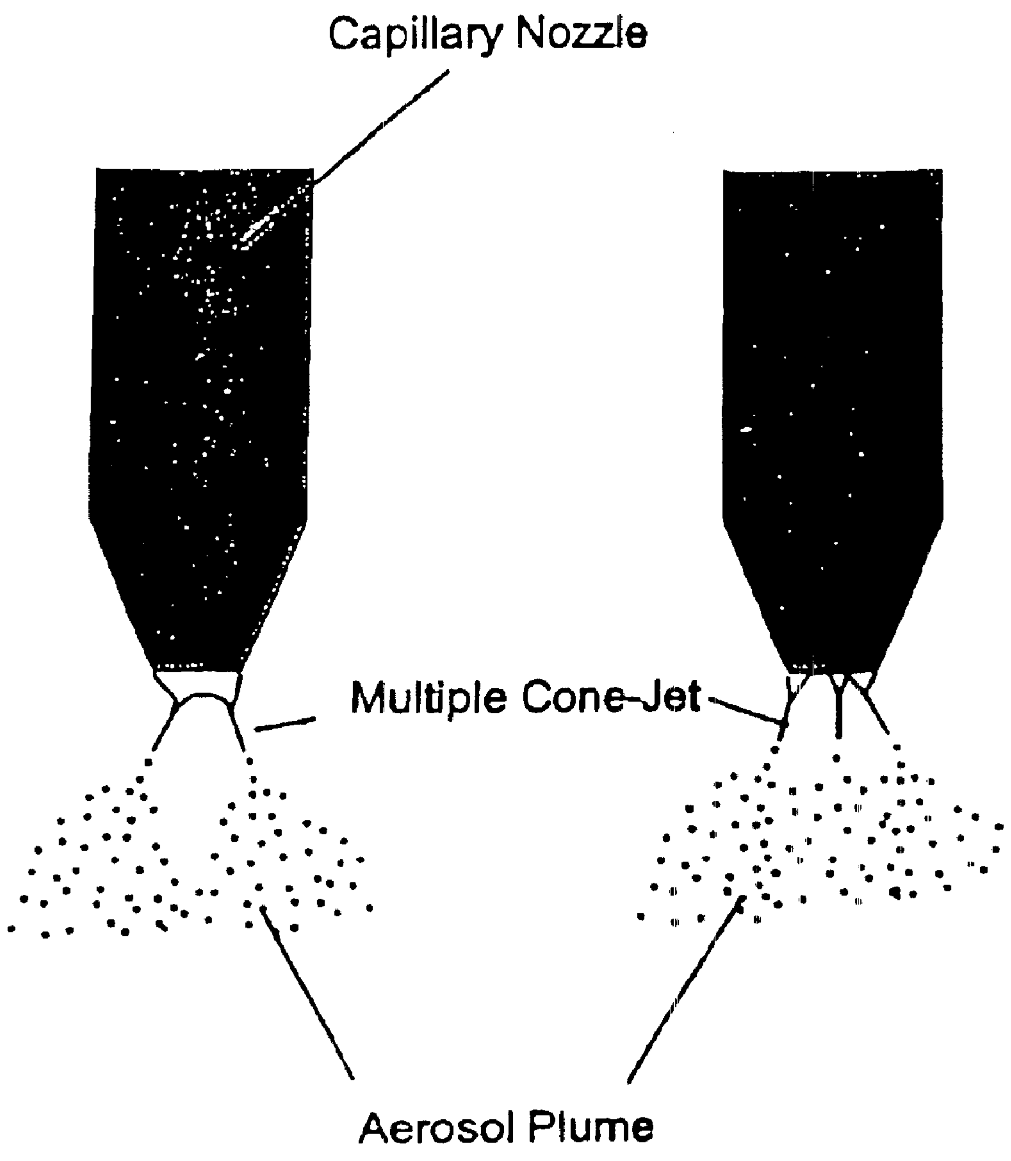
FIG. 7 Depicts the multi-jet mode. In this mode, a very high electric field generates multiple cone-jets on one capillary nozzle. These jets may be stable, but are more often chaotic in their position and spray direction.
Figure 8:
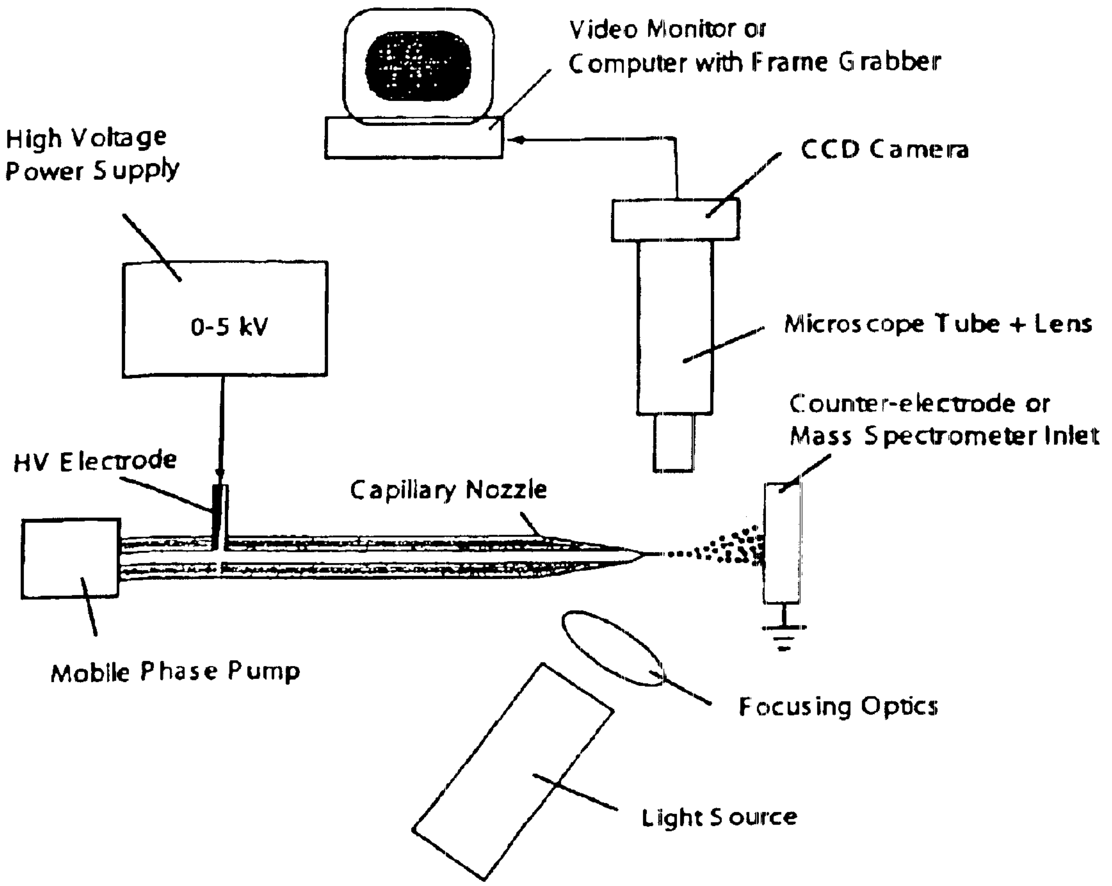
Figure 8 (prior art)
FIG. 8 (Prior Art): Depicts a conventional system for mode control utilizing a light source and a microscope based imaging system. The illumination may be either for transmitted light or scattered light. The detector may be the human eye, photographic film, or a video camera.
Figure 9A:
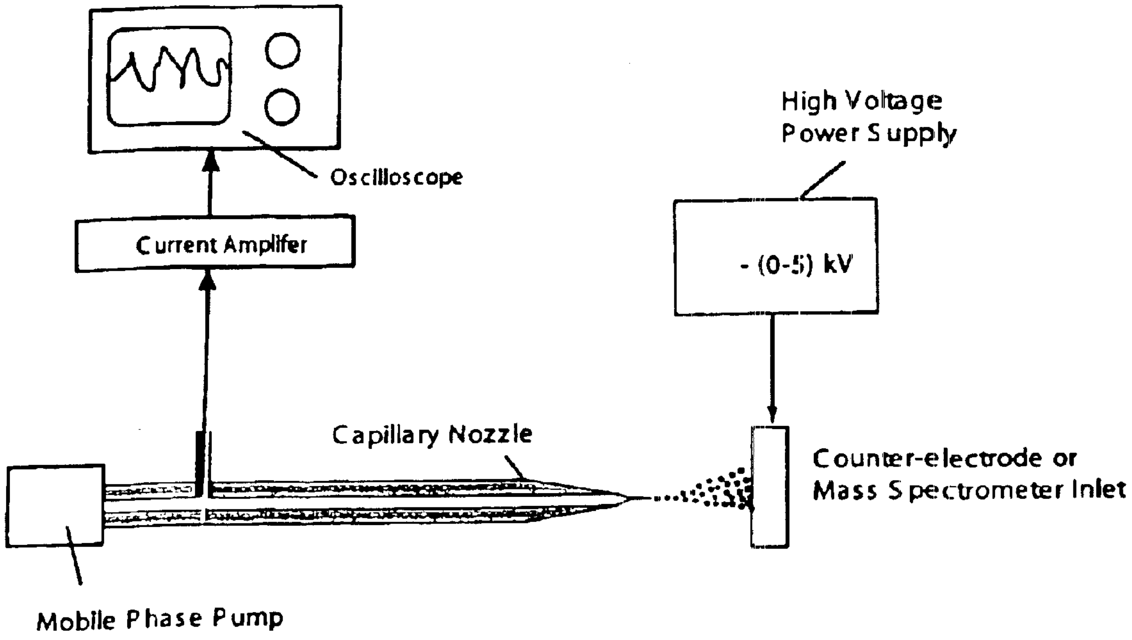
Figure 9A (prior art)
FIG. 9A (Prior Art): Depicts a system for monitoring spray current pulsation by using an oscilloscope to monitor the current at the capillary nozzle. In this configuration the nozzle is held at ground potential while the counter-electrode is held at high voltage. The oscilloscope is preferably a digital unit capable of Fourier transform frequency analysis.
Figure 9B:
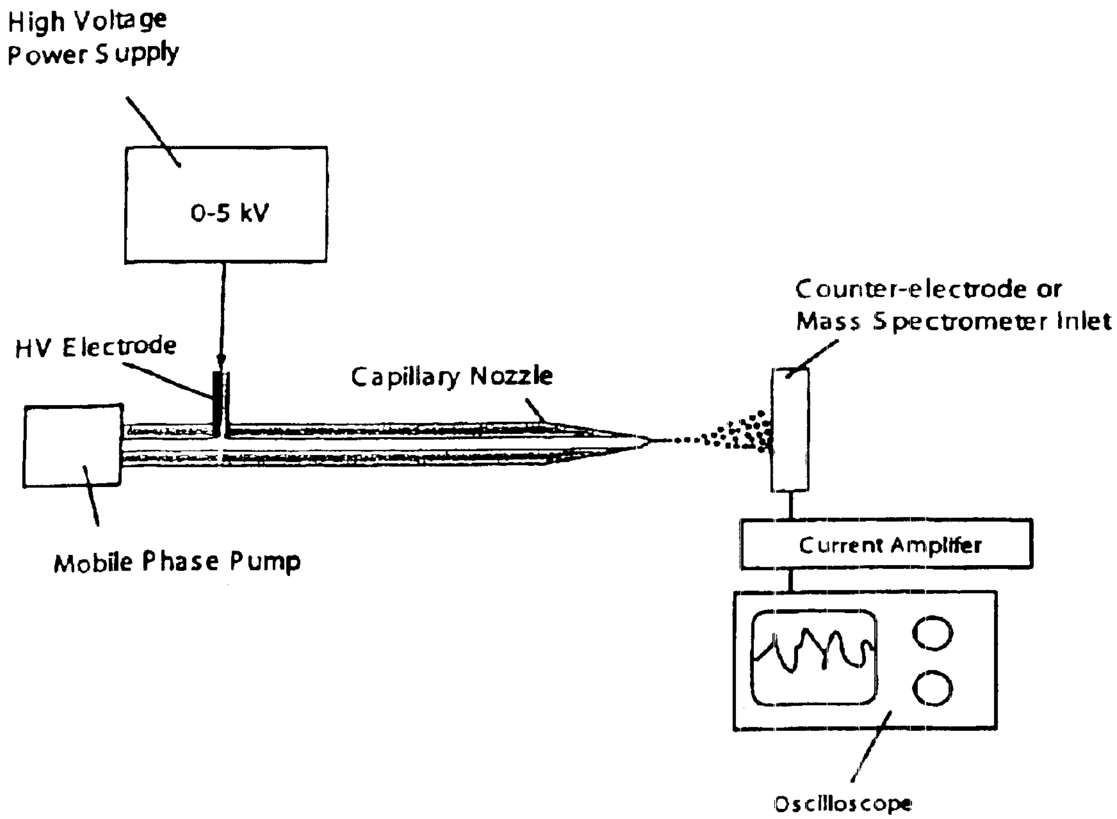
Figure 9B (prior art)
FIG. 9B (Prior Art) Depicts a system for monitoring spray current pulsation by using an oscilloscope to monitor the current at the counter-electrode. The oscilloscope is preferably a digital unit capable of Fourier transform frequency analysis.

FIG. 23 shows a block diagram of an alternate embodiment to that of FIG. 22. In this embodiment, the pulse timing circuit 307 is replaced by a pulse timing algorithm 309 in computer 14 that is interfaced to trigger the strobe light 308 through a digital pulse interface 310. Acquisition of the images by the image interface 200 is timed to coincide with the strobe output of 308 through waveform interface 200, which provides triggering information to 200. The waveform analysis algorithm 301 is then capable of controlling the phase and pulse width of the strobed illumination so that the image obtained by 200 is tailored to be mode specific. In this way the image analysis algorithm 202 is then provided with optimal images, thus increasing improved certainty in subsequent analysis. For example, lower frequency events detected by photo-detector 32 can be given longer exposure times by 308. In addition, the strobe pulses from 308 could be swept or varied in time so that 200 can acquire multiple exposures in rapid succession. These multiple exposures then provide algorithm 202 with an improved basis for modal determination, providing "time course" images similar to those shown in FIGS. 3, 4, and 5.

In a particularly advantageous embodiment, a con-focal optical system is used to obtain an image of improved precision. As illustrated in FIGS. 24A and 24B, a laser beam from light source 7 (not shown) is focused through lens 71 to a diffraction limited spot on jet 9. This beam of light is in the plane of the nozzle and is perpendicular to the axis of the nozzle. The focal point of the beam is coincident with jet 9 emerging from nozzle 1. The precise focal point is determined by varying the beam position or nozzle position so that the signal amplitude at the photo detector 32 is maximized. Generally, the smaller the size of the focused spot, the higher the signal intensity at the detector. As the spot size is diminished, however, the precision required in positioning is increased.

The light passing through jet 9 is focused by con-focal lens 713 to pinhole detector aperture and on to detector 32. Through the use of a con focal lens, the focused cone of light from the source focal point and the cone of light to the detector aperture pin-hole or photo-detector are coincident. The use of a con-focal illumination and detection system serves to increase the signal to noise ratio at the detector by rejecting light from focal planes not coincident with the focal point.

FIG. 24B is a view of the arrangement shown in FIG. 24A, viewed down the axis of the capillary nozzle.

In a further embodiment of the dynamic control system, the light source and detector share a common optical path in an epi-illumination scheme. epi-illumination is a well known concept among those skilled in the art of con-focal optics. As shown in FIG. 25, the lens which focuses the light from the light source also focuses collects the light and focuses it to the detector. As shown the light source 7 and photo-detector 32 are on the same side same side of lens 40, and beam splitter 50 sends collected light to the detector.

In yet a further embodiment of the dynamic control system of the invention, a second photo detector is placed adjacent to the first photo detector, and their outputs are supplied to a differential amplifier which, in turn, provides a signal to the computer. This arrangement helps eliminate noise inherent to the light source, and also provides improved signal-to-noise ratios for low amplitude signals. This embodiment is especially useful for low mobile phase flow rates. As illustrated in FIG. 26, which is a view of the dual-detector system as seen down the axis of the capillary nozzle 1, light from light source 7 passing through lens 71 illuminates the electrospray (not shown, as it would be coming out of the paper). The light from the electrospray is detected by both photo detector 32A and photo detector 32B, through their respective lenses 80A and 80B. The photo-detectors each generate a signal in accordance with the light detected by them, and those signals are transmitted to differential amplifier 90. Amplifier 90 produces a signal that is the difference between the two photo-detector signals, and sends that signal to computer 14.

In a further embodiment of the invention, the light source can be remote from the remainder of the control system, and the light can be provided to the system through fiber optics. As shown in FIG. 27, which is the same as the embodiment of FIG. 24A, except that a remote light source and fiber optic cable are used instead of the light source of FIG. 24A. As seen, a light source 7, such as a laser, is remote from the remainder of the control system. The light from light source 7 is focused through lens 72 into fiber optic cable 73. The light is conducted by fiber optic cable 73 to focusing lens 71, which then focuses it onto the electrospray jet 9. The light passing through electrospray jet 9 is focused by lens 712 to a pinhole detector aperture 33 and thence on to detector 32.

In a still further embodiment of the invention, multiple light sources can be used, especially with the aid of fiber optics. In this way, one beam of light can, for example, probe the electrospray jet and the other can probe the electrospray plume. As shown in FIG. 28, light sources 7A and 7B focus light through electrospray jet 9 and electrospray plume 6, which light is then focused by lenses 712A and 712B to photodetectors 32A and 32B.

Although the static, dynamic and hybrid control systems have been exemplified as operating on the high voltage power supply to tune the electrospray system and control the morphology of the electrospray, it is equally within the scope of the present invention to adjust the distance between the nozzle discharge point and the counter electrode instead of or together with adjustment of the voltage to control electrospray morphology. Thus, using the same control schemes as heretofore described, the output from the computer can be directed to a motor which moves the electrospray closer to or further away from the counterelectrode, as necessary, to achieve the desired electrospray pattern or shape. FIG. 29 depicts an electrospray control system which is analogous to that of FIG. 10, except that the output of computer 14 is transmitted to motor driven translation stage 35, which moves capillary nozzle either towards or away from counterelectrode 5 as necessary to maintain the optimum electrospray pattern or form.

The feedback control system of the present invention is useful for the control of any of the known electrospray apparatus, including, but not limited to those used for Ionization of Liquid Samples ionization of samples for analysis by Mass Spectrometry;

interfacing of Liquid Chromatography with Mass Spectrometry;

interfacing of Capillary Electrophoresis, and related methods, with Mass Spectrometry; and interfacing of Ion Chromatography with Mass Spectrometry.

Deposition of Materials

Thin film fabrication by Electrospray;

deposition of samples onto solid substrates by Electrospray, such as, for example, the deposition of samples for subsequent analysis by laser ionization mass spectrometry.

Ion Thrusters

Control of the electrospray process in ion engines used to propel small satellites, i.e., as "colloidal thrusters".

We claim:

1. A method for controlling an electrospray of fluid emitted by an electrospray nozzle communicating with a source of electrical potential and having a nozzle tip which is displaced from a counterelectrode or mass spectrometer inlet, to achieve and maintain a predetermined electrospray pattern, which comprises a) focusing light from a source of light to intersect one or more of the liquid cone, jet and plume of the fluid emitted by the electrospray nozzle, b) detecting scattered light patterns, transmitted light patterns or both, passing through, reflected by or emitted from said fluid emitted by said electrospray nozzle as a result of said intersection of said light with said one or more of said liquid cone, jet and plume, with one or more photo detectors and generating analog electronic signals containing sufficient information to represent the detected scattered light patterns, transmitted light patterns, or both, c) converting said analog electronic signals into a digital electronic patterns, d) interpreting said digital electronic patterns with a first computer or microprocessor system, and transmitting said interpreted patterns to a second computer or microprocessor, e) comparing said interpreted patterns to a reference pattern, which is defined by the predetermined electrospray pattern, with a second computer or microprocessor, and generating a control signal in response to said comparison, and transmitting said control signal to a controller, which, in accordance with said control signal, f) displaces said nozzle or said counterelectrode, or both, to adjust the distance between said electrospray nozzle and said counterelectrode or changes the voltage applied to said nozzle with respect to said counter electrode or mass spectrometer inlet if and to the extent necessary to adjust the morphology of said electrospray to result in an interpreted pattern towards that of the predetermined electrospray pattern.

2. The method of claim 1, wherein said first computer or microprocessor and said second computer or system are combined into a single computer or microprocessor.

3. The method of claim 1 wherein an amplification system is incorporated in said one or more photo detectors, and said analog electronic signals are amplified.

4. The method of claim 1, wherein said one or more photo detectors are one or more photo diodes, one or more CCD cameras, or one or more of each.

5. The feedback control system of claim 4 wherein said one or more photo detectors is a CCD camera and said CCD camera is combined with a microscope.

6. The method of claim 5, wherein said source of light is a continuous source of light and said controller changes the voltage applied to said nozzle with respect to said counter electrode or said mass spectometer inlet.

7. The method of claim 6 wherein first computer is programmed with a first algorithm for empirical image measurement, said first algorithm being responsive to the digital electronic pattern, and said second computer is programmed with a second algorithm for generating and maintaining conditions in the of said electrospray to produce an image of a predetermined electrospray pattern.

8. The method of claim 7, wherein said second algorithm is adapted to control an electrical power supply to said electrospray nozzle and adjust the voltage provided by said source of electrical potential to maintain said electrospray pattern to include a plume in a cone-jet mode.

9. The feedback control system of claim 7, wherein said second algorithm is adapted to control an electrical power supply to said electrospray nozzle and adjust the voltage provided by said electrical power supply to maintain said electrospray pattern to include a plume in a dripping mode.

10. The method of claim 6 wherein said electrospray nozzle is a multi-jet nozzle, said controller is an image morphology control system, said first computer is programmed with a first algorithm for empirical image measurement, said first algorithm being responsive to the morphologies of a plurality of electrospray plumes emanating from said multi-jet nozzle, and said second computer is programmed with a second algorithm for generating and maintaining predetermined morphological conditions in said electrospray plumes.

* * * * *